US012645587B2

(12) United States Patent
Yi et al.

(10) Patent No.: US 12,645,587 B2
(45) Date of Patent: Jun. 2, 2026

(54) STORAGE CONTROLLER, OPERATING METHOD OF THE STORAGE CONTROLLER, AND OPERATING METHOD OF STORAGE DEVICE

(71) Applicant: Samsung Electronics Co., Ltd., Suwon-si (KR)

(72) Inventors: Hyunju Yi, Suwon-si (KR); Byungchul Ko, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 5 days.

(21) Appl. No.: 18/783,598

(22) Filed: Jul. 25, 2024

(65) Prior Publication Data

US 2025/0139003 A1     May 1, 2025

(30) Foreign Application Priority Data

Oct. 25, 2023    (KR) ........................ 10-2023-0144173

(51) Int. Cl.
 *G06F 12/02* (2006.01)
 *G06F 12/1045* (2016.01)
 *G06F 13/16* (2006.01)
(52) U.S. Cl.
 CPC ...... *G06F 12/0292* (2013.01); *G06F 12/1045* (2013.01); *G06F 13/1673* (2013.01)
(58) Field of Classification Search
 CPC ............. G06F 12/0292; G06F 12/1045; G06F 12/1081; G06F 12/0246; G06F 12/0855;
 (Continued)

(56) References Cited

U.S. PATENT DOCUMENTS 11,586,692 B2    2/2023  Bhattacharjee et al.
11,741,034 B2    8/2023  Nam et al.
 (Continued)

FOREIGN PATENT DOCUMENTS

CN      105404597     * 10/2015
KR     20200051450 A     5/2020
 (Continued)

OTHER PUBLICATIONS

Extended European Search Report corresponding to EP Patent Application No. 24199998.6 (mailed Mar. 6, 2025).

*Primary Examiner* — Tracy C Chan
(74) *Attorney, Agent, or Firm* — Wolf, Greenfield & Sacks, P.C.

(57)    ABSTRACT

Provided is an operating method of a storage controller that includes a buffer memory, an address manager, and a direct memory access (DMA) engine and controls a non-volatile memory device. The operating method includes receiving, from an external host device, a read request including a host address, storing, by an address manager in response to the read request, mapping information about the host address and a command identifier corresponding to the read request in a translation table, setting, by the DMA engine, a destination address of read data corresponding to the read request to a virtual address corresponding to the command identifier, and transmitting the read data to the virtual address, and translating, by the address manager based on the translation table, the destination address of the read data from the virtual address to the host address.

20 Claims, 15 Drawing Sheets

(58) Field of Classification Search
     CPC ...... G06F 12/10; G06F 13/1673; G06F 13/28;
               G06F 11/0727; G06F 11/0751; G06F
          11/0793; G06F 11/4063; G06F 3/0655;
               G06F 3/0679; G06F 3/0604; G06F
                         2212/608; G06F 2212/1024
     See application file for complete search history.

(56)                References Cited

U.S. PATENT DOCUMENTS

| | | | |
|---|---|---|---|
| 2014/0281056 A1* | 9/2014 | Davda ................. | G06F 12/1027 |
| | | | 710/26 |
| 2015/0046625 A1* | 2/2015 | Peddle .............. | G11C 14/0018 |
| | | | 710/308 |
| 2017/0060770 A1* | 3/2017 | Arroyo ................... | G06F 13/28 |
| 2017/0199827 A1* | 7/2017 | Sankaran ............ | G06F 12/1081 |
| 2018/0239726 A1* | 8/2018 | Wang .................... | G06F 12/109 |
| 2021/0255956 A1 | 8/2021 | Kuyel | |
| 2022/0050770 A1 | 2/2022 | Das Purkayastha et al. | |
| 2022/0147476 A1* | 5/2022 | Nam ..................... | G06F 3/0647 |
| 2022/0283975 A1* | 9/2022 | Meyer ................. | G06F 12/0292 |
| 2023/0086756 A1 | 3/2023 | Lv et al. | |

FOREIGN PATENT DOCUMENTS

| | | |
|---|---|---|
| KR | 20220061771 A | 5/2022 |
| KR | 20230076709 A | 5/2023 |

* cited by examiner

Figure 5:
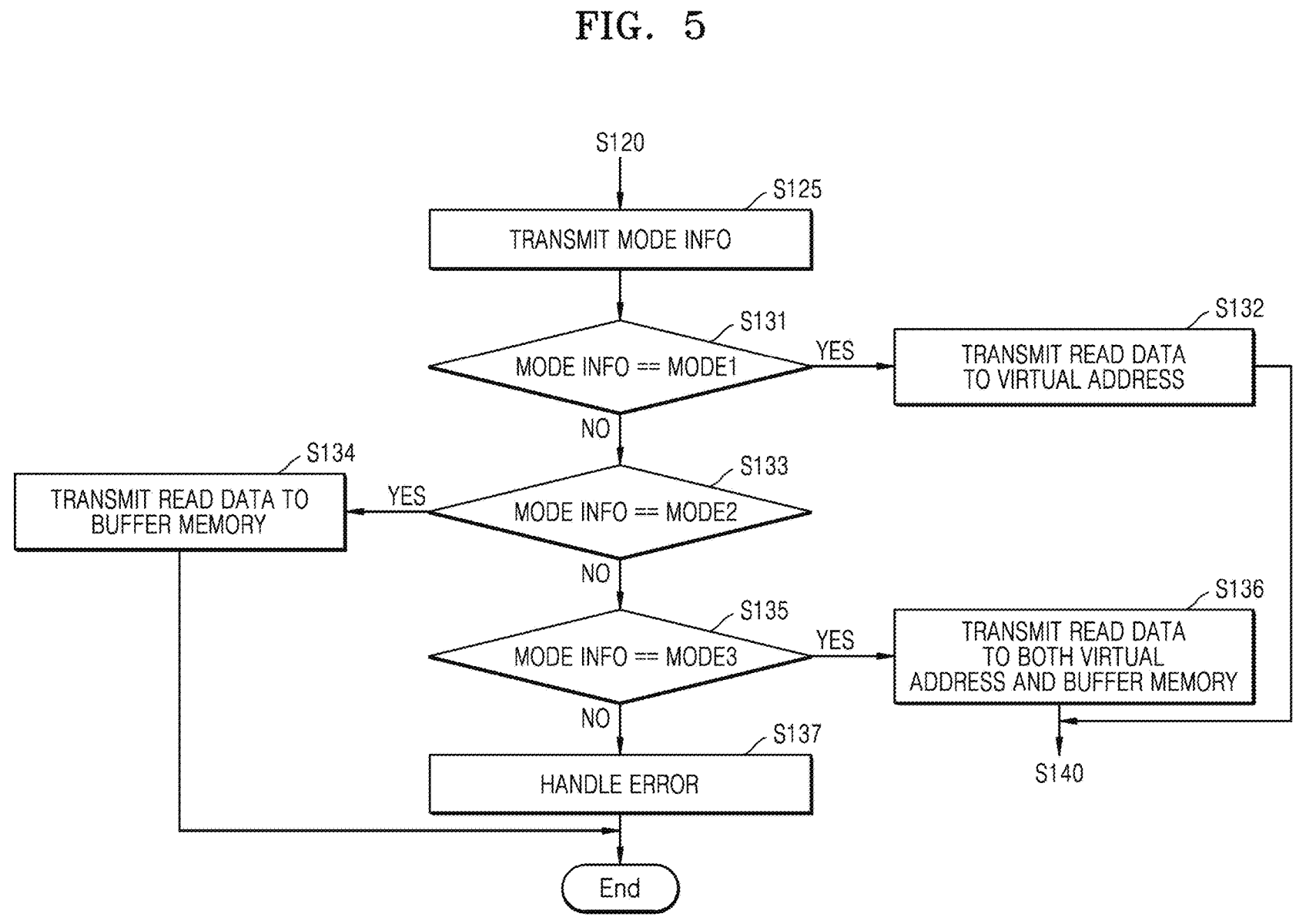

S125
TRANSMIT MODE INFO

S131
MODE INFO == MODE1

S132
TRANSMIT READ DATA TO VIRTUAL ADDRESS — YES

NO

S133
MODE INFO == MODE2

S134
TRANSMIT READ DATA TO BUFFER MEMORY — YES

NO

S135
MODE INFO == MODE3

S136
TRANSMIT READ DATA TO BOTH VIRTUAL ADDRESS AND BUFFER MEMORY — YES

S140

NO

S137
HANDLE ERROR

End

HI — HOST I/F (S401) READ RQ 3(RQ3) [HA3]

Figure 7A:
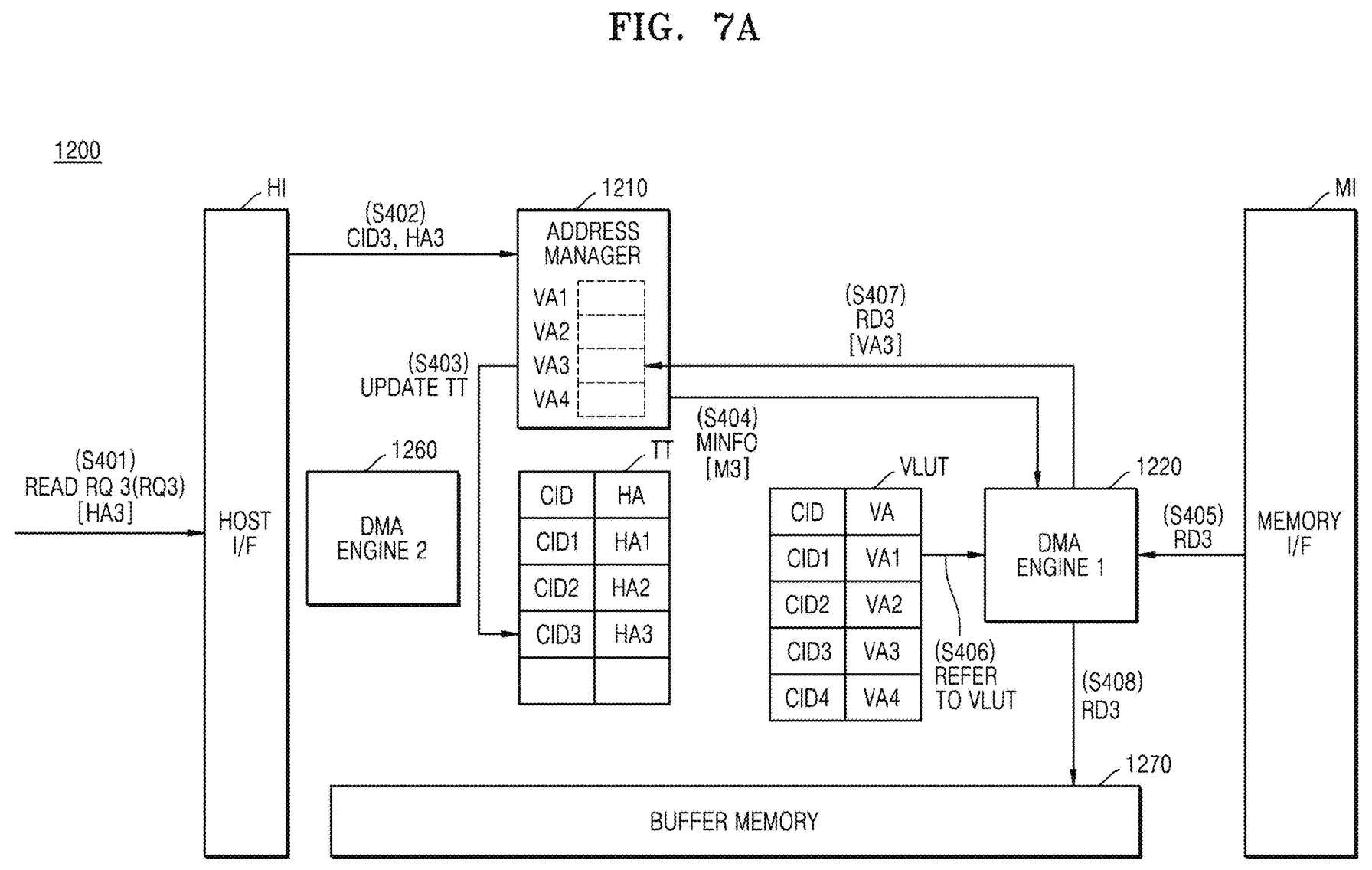

(S402) CID3, HA3

1260 — DMA ENGINE 2

1210 — ADDRESS MANAGER

| | VA1 | VA2 | VA3 | VA4 |
|---|---|---|---|---|

TT

| CID | HA |
|---|---|
| CID1 | HA1 |
| CID2 | HA2 |
| CID3 | HA3 |
| | |

(S403) UPDATE TT (S404) MINFO [M3]

(S407) RD3 [VA3]

VLUT

| CID | VA |
|---|---|
| CID1 | VA1 |
| CID2 | VA2 |
| CID3 | VA3 |
| CID4 | VA4 |

(S406) REFER TO VLUT

1220 — DMA ENGINE 1

(S405) RD3

MI — MEMORY I/F (S408) RD3

1270 — BUFFER MEMORY

STORAGE CONTROLLER, OPERATING METHOD OF THE STORAGE CONTROLLER, AND OPERATING METHOD OF STORAGE DEVICE

RELATED APPLICATIONS

This application is based on and claims priority under 35 U.S.C. § 119 to Korean Patent Application No. 10-2023-0144173, filed on Oct. 25, 2023, in the Korean Intellectual Property Office, the disclosure of which is incorporated by reference herein in its entirety.

BACKGROUND OF THE INVENTION

The inventive concept relates to a semiconductor memory, and more particularly, to a storage controller, an operating method of the storage controller, and an operating method of a storage device.

Semiconductor memories may be classified into volatile memory devices (e.g., static random access memory (RAM) (SRAM), dynamic RAM (DRAM), etc.) that lose stored data when power is interrupted and non-volatile memory devices (e.g., flash memory, phase-change RAM (PRAM), magnetic RAM (MRAM), resistive RAM (RRAM), ferroelectric RAM (FRAM), etc.) that retain stored data even when power is interrupted.

A storage device may transmit, to a host device, data stored in a non-volatile memory device. A storage controller may perform an error correction operation, such as low density parity check (LDPC), on read data that is read from a non-volatile memory device. Thereafter, the storage controller may store the error-corrected read data in a buffer memory, such as SRAM. A first direct memory access (DMA) engine included in the storage controller may read data from the non-volatile memory device and write the read data to the buffer memory. A second DMA engine included in the storage controller may read data stored in the buffer memory and transmit the read data to the host device.

SUMMARY OF THE INVENTION

The inventive concept provides a storage controller with improved performance, an operating method of the storage controller, and an operating method of a storage device.

According to an aspect of the inventive concept, there is provided an operating method of a storage controller that includes a buffer memory, an address manager, and a direct memory access (DMA) engine and controls a non-volatile memory device, the operating method including receiving, from an external host device, a read request including a host address, storing, by the address manager in response to the read request, mapping information about the host address and a command identifier corresponding to the read request in a translation table, setting, by the DMA engine, a destination address of read data corresponding to the read request to a virtual address corresponding to the command identifier and transmitting the read data to the virtual address, and translating, by the address manager based on the translation table, the destination address of the read data from the virtual address to the host address.

According to another aspect of the inventive concept, there is provided an operating method of a storage device including a non-volatile memory device and a storage controller that includes a host interface circuit, an address manager, a direct memory access (DMA) engine, and a non-volatile memory interface circuit and controls the non-volatile memory device, the operating method including receiving, by the host interface circuit, a read request including a host address from an external host device, storing, by the address manager, mapping information about the host address and a command identifier corresponding to the read request received from the host interface circuit in a translation table, generating, by the address manager, mode information and transmitting the mode information to the DMA engine, setting, by the DMA engine, a destination address of read data to a virtual address based on the mode information and transmitting the read data to the virtual address, translating, by the address manager, the destination address of the read data from the virtual address to the host address, and transmitting, by the host interface circuit, the read data to the host address.

According to another aspect of the inventive concept, there is provided a storage controller including a host interface circuit configured to receive a read request from an external host device and transmit, to the external host device, read data corresponding to the read request, an address manager configured to receive a command identifier and a host address from the host interface circuit, store mapping information about the command identifier and the host address in a translation table, and perform an address translation operation to translate a destination address of the read data from a virtual address to the host address, and a direct memory access (DMA) engine configured to set the destination address of the read data to the virtual address based on mode information received from the address manager and transmit the read data to the virtual address.

BRIEF DESCRIPTION OF THE DRAWINGS

Embodiments will be more clearly understood from the following detailed description taken in conjunction with the accompanying drawings in which:

FIGS. 4A and 4B are diagrams for describing an operating method of a storage controller, according to an embodiment;

FIG. 5 is a flowchart illustrating an example of an operating method of a storage controller, according to an embodiment;

FIGS. 7A and 7B are diagrams for describing an operating method of a storage controller, according to an embodiment;

DETAILED DESCRIPTION

Hereinafter, embodiments of the inventive concept will be described clearly and in detail so that those of ordinary skill in the art may easily practice the inventive concept.

Figure 1:
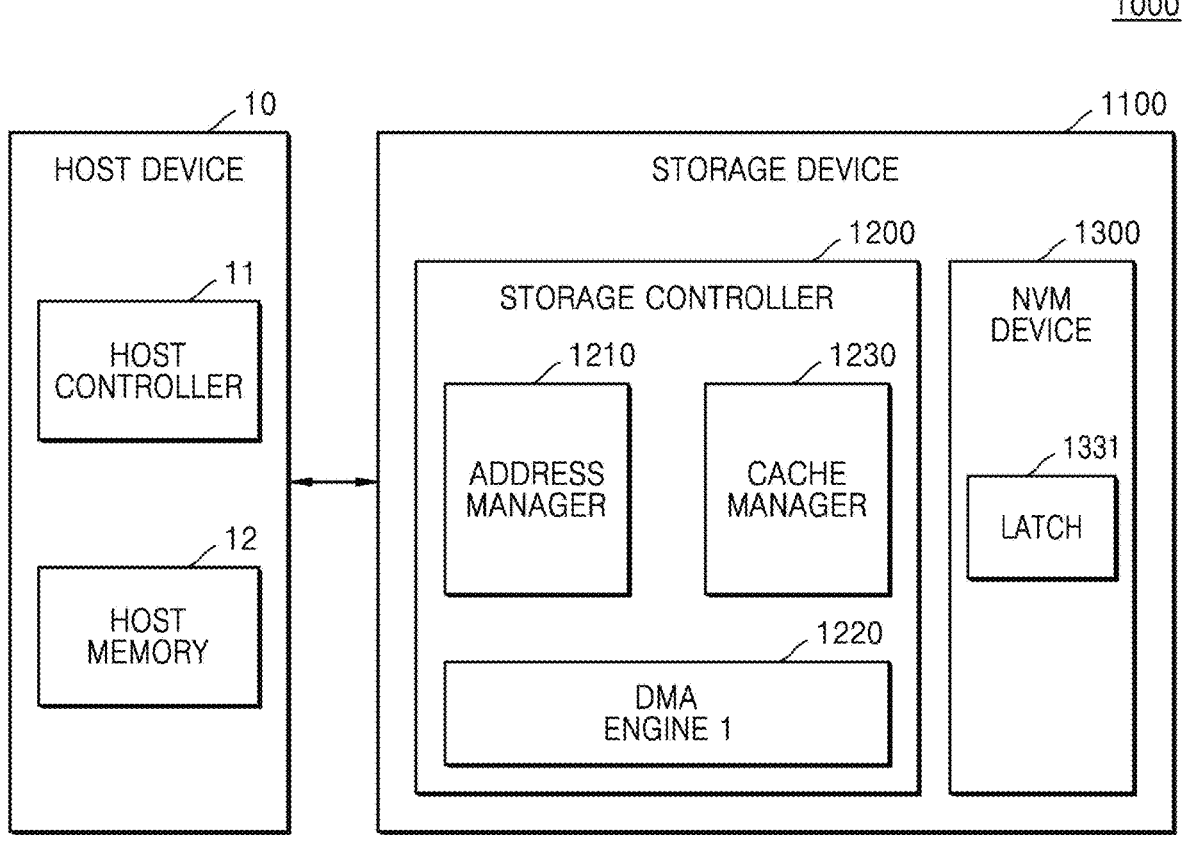
FIG. 1 is a block diagram illustrating a storage system according to an embodiment.

FIG. 1 is a block diagram illustrating a storage system 1000 according to an embodiment.

Referring to FIG. 1, the storage system 1000 may include a host device 10 and a storage device 1100. The storage system 1000 may be implemented as electronic devices, such as personal computers (PCs), laptop computers, mobile phones, smartphones, tablet PCs, personal digital assistants (PDAs), enterprise digital assistants (EDAs), digital still cameras, digital video cameras, audio devices, portable multimedia players (PMPs), personal navigation devices or portable navigation devices (PNDs), MP3 players, handheld game consoles, or e-books. In addition, the storage system 1000 may be implemented as various types of electronic devices such as wearable device, for example, wristwatches or head-mounted displays (HMDs).

The host device 10 may control data processing operations (e.g., a data read operation or a data write operation) with respect to the storage device 1100. The host device 10 may refer to a data processing device capable of processing data, such as a central processing unit (CPU), a processor, a microprocessor, or an application processor (AP). The host device 10 may execute an operating system (OS) and/or various applications.

Specifically, the host device 10 may include a host controller 11 and a host memory 12. The host controller 11 may be a device configured to control overall operations of the host device 10 or control the storage device 1100 on the host device side. The host memory 12 may be a buffer memory, a cache memory, or a working memory used in the host device 10.

In an embodiment, the host memory 12 may function as a buffer memory configured to temporarily store data to be transmitted to the storage device 1100 or data transmitted from the storage device 1100. The host device 10 may transmit a request to the storage device 1100 and receive a response from the storage device 1100. For example, when the request is a write request, the request may include write data. As another example, when the request is a read request, the response to the request may include read data.

The storage device 1100 may operate under the control of the host device 10. The storage device 1100 may include a storage controller 1200 and a non-volatile memory (NVM) device 1300. The storage controller 1200 may perform various management operations so as to efficiently use the NVM device 1300. The NVM device 1300 may include a plurality of NVMs.

The storage device 1100 may receive a request from the host device 10 and transmit a response to the host device 10. For example, when the request is a write request, the storage controller 1200 may control the NVM device 1300 to write data to the NVM device 1300 in response to the write request from the host device 10. In another example, when the request is a read request, the storage controller 1200 may control the NVM device 1300 to read data stored in the NVM device 1300 in response to the read request from the host device 10.

When the NVM device 1300 includes flash memory, the flash memory may include a two-dimensional (2D) NAND memory array or a three-dimensional (3D) (or vertical) NAND (VNAND) memory array. As another example, the storage device 1100 may include various other types of NVMs. For example, magnetic random access memory (RAM) (MRAM), spin-transfer torque MRAM, conductive bridging RAM (CBRAM), ferroelectric RAM (FeRAM), phase-change RAM (PRAM), resistive RAM (RRAM), and various other types of memory may be applied to the storage device 1100.

The storage controller 1200 may include an address manager 1210, a first direct memory access (DMA) engine 1220, and a cache manager 1230. For example, the address manager 1210, the first DMA engine 1220, and the cache manager 1230 may be implemented in the form of software, hardware, or a combination of software and hardware.

The storage controller 1200 may transmit read data read from the NVM device 1300 to the host device 10 without passing through the buffer memory. The storage controller 1200 may use a virtual address to directly transmit the read data to the host device 10 without writing the read data to the buffer memory.

The address manager 1210 may manage address translation information (e.g., a translation table (TT)) between a command identifier and a host address. For example, the TT is a data structure that stores mapping between the command identifier and the host address. The address manager 1210 may store mapping information between the command identifier and the host address in the TT.

The TT may include information obtained by mapping the relationship of the host address to the command identifier. The TT may include a plurality of entries. Each of the entries in the TT may include a command identifier and a host address. The TT is a table for translating a virtual address to a host address.

The address manager 1210 may perform an address translation operation. The address manager 1210 may perform the address translation operation based on the TT. The address translation operation may refer to an operation of translating a virtual address to a host address. The address manager 1210 may translate the virtual address to the host address by referring to the TT.

The first DMA engine 1220 may perform a DMA operation based on mode information received from the address manager 1210. The first DMA engine 1220 may transmit read data to the host device 10 without passing through the buffer memory. The first DMA engine 1220 may use a virtual address to transmit the read data to the host device 10. The first DMA engine 1220 may set a destination address of the read data to a virtual address and transmit the read data to the virtual address. In an embodiment, the first DMA engine 1220 may read the read data from the NVM device 1300. The first DMA engine 1220 may transmit the read data to the virtual address.

The address manager 1210 may perform a DMA operation based on a virtual look-up table (VLUT). The first DMA engine 1220 may transmit the read data to the virtual address by referring to the VLUT. The first DMA engine 1220 may retrieve the virtual address corresponding to the command identifier. The first DMA engine 1220 may retrieve the virtual address by referring to the VLUT, based on the command identifier corresponding to the read data.

The VLUT may include information obtained by mapping the relationship of the virtual address to the command identifier. The VLUT is a table for transmitting the read data to the virtual address. The VLUT may be previously determined or updated.

The storage controller 1200 may generate and store the VLUT. The storage controller 1200 may manage the VLUT. The storage controller 1200 may allocate virtual addresses to command identifiers. The storage controller 1200 may allocate different virtual addresses to command identifiers. That is, the command identifiers may have different virtual addresses.

The virtual addresses allocated to the command identifiers may be referred to as a virtual address range. The virtual address range may include the allocated virtual addresses. For example, the size of the virtual address range may be equal to a result of a multiplication operation on the number of command identifiers and a page size (e.g., 4 KB).

In an embodiment, the cache manager 1230 may implement a cache. The cache may include a sub-buffer and a latch 1331 of the NVM device 1300. When read data is stored in the sub-buffer and the latch 1331 of the NVM device 1300, the cache manager 1230 may load the read data from the sub-buffer or the latch 1331 of the NVM device 1300. For example, the sub-buffer may be a memory of an error correction code (ECC) engine (e.g., an ECC engine 1280 (FIG. 2) in the storage controller 1200).

In an embodiment, the cache manager 1230 may determine whether a cache hit has occurred. The cache manager 1230 may determine whether read data corresponding to a read request is stored in the cache (e.g., a cache in the NVM device 1300). When the cache manager 1230 determines that the cache hit has occurred, the cache manager 1230 may load the read data from the cache. That is, when the read data is stored in the cache, the cache manager 1230 may load the read data from the cache, instead of reading data from the memory cell array of the NVM device 1300. Therefore, read latency may be reduced. The operating method of the cache manager 1230 is described in more detail with reference to FIGS. 8 and 9.

Figure 2:
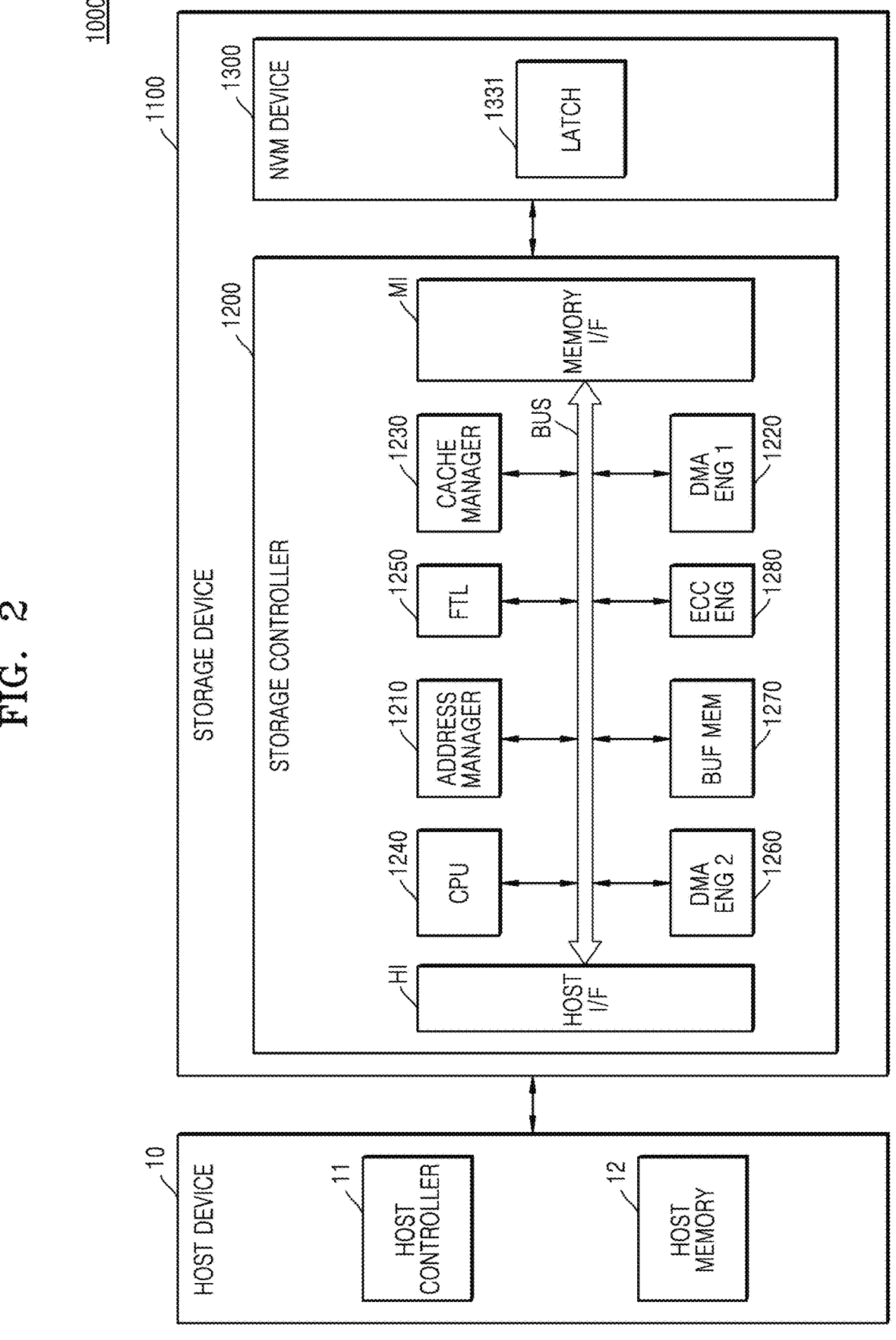
FIG. 2 is a block diagram illustrating a storage system according to an embodiment.

As described above, the storage device 1100 may transmit, to the host device 10, the read data corresponding to the read request by using the virtual address, without writing the read data to the buffer memory 1270 (FIG. 2). Accordingly, the storage device 1100 may provide short read latency and reduce the size of the buffer memory 1270 included in the storage controller 1200.

FIG. 2 is a block diagram illustrating a storage system according to an embodiment.

Referring to FIG. 2, the storage system 1000 may include a host device 10 and a storage device 1100. The host device 10 may include a host controller 11 and a host memory 12. The storage device 1100 may include a storage controller 1200 and a NVM device 1300. The NVM device 1300 may include a latch 1331. For convenience of explanation, a detailed description of the elements described above is omitted.

The storage controller 1200 may include an address manager 1210, a first DMA engine 1220, a cache manager 1230, a CPU 1240, a flash translation layer (FTL) 1250, a buffer memory 1270, an ECC engine 1280, a host interface circuit HI, an NVM interface circuit MI, and a bus BUS. The storage controller 1200 may further include a packet manager (not shown), an advanced encryption standard (AES) engine (not shown), and the like.

The storage controller 1200 may further include a working memory (not shown) into which the FTL 1250 is loaded. The CPU 1240 may execute the FTL 1250 to control a data write operation and a data read operation with respect to the NVM device 1300.

In an embodiment, the CPU 1240 may be implemented as a multi-core processor. For example, the CPU 1240 may be implemented as a dual-core processor or a quad-core processor. The address manager 1210, the cache manager 1230, and the FTL 1250 may be loaded into the working memory of the storage controller 1200. For example, the working memory may be implemented as a volatile memory (e.g., static RAM (SRAM) or dynamic RAM (DRAM)) or a non-volatile memory (e.g., flash memory or PRAM).

The FTL 1250 may execute several functions, such as address mapping, wear-leveling, and garbage collection. The address mapping is an operation of translating a logical address received from the host device 10 to a physical address used to actually store data in the NVM device 1300. The wear-leveling is technology for impeding/preventing excessive deterioration of specific blocks by allowing blocks in the NVM device 1300 to be used uniformly. For example, the wear-leveling may be implemented through firmware technology for balancing erase counts of physical blocks. The garbage collection is technology for securing usable capacity within the NVM device 1300 by copying valid data of a block to a new block and then erasing the existing block.

The buffer memory 1270 may be configured to temporarily store write data received from the host device 10 or data read from the NVM device 1300 under the control of the storage controller 1200. For example, the buffer memory 1270 may be configured to be controlled by the CPU 1240, the first DMA engine 1220, and the second DMA engine 1260. Hereinafter, it is assumed that the buffer memory 1270 is SRAM. However, the scope of the inventive concept is not limited thereto.

For example, the buffer memory 1270 may include high-speed RAM, such as DRAM and synchronous DRAM (SDRAM). Alternatively, the buffer memory 1270 may include an NVM, such as read-only memory (ROM), programmable ROM (PROM), electrically programmable ROM (EPROM), electrically erasable and programmable ROM (EEPROM), flash memory, PRAM, MRAM, RRAM, ferroelectric RAM (FRAM), or thyristor RAM (TRAM).

The ECC engine 1280 may perform an error detection and correction function on the read data read from the NVM device 1300. More specifically, the ECC engine 1280 may generate parity bits for write data to be written to the NVM device 1300, and the generated parity bits may be stored in the NVM device 1300 together with the write data. Upon reading data from the NVM device 1300, the ECC engine 1280 may correct errors in the read data by using the parity bits read from the NVM device 1300 together with the read data and may output the error-corrected read data.

In an embodiment, the ECC engine 1280 may correct errors by using coded modulation, such as soft decoding, low density parity check (LDPC) code, Bose-Chaudhuri-Hocquenghem (BCH) code, turbo code, Reed-Solomon code, convolutional code, recursive systematic code (RSC), trellis-coded modulation (TCM), or block coded modulation (BCM), or various other schemes.

The AES engine (not shown) may perform at least one of an encryption operation and a decryption operation on data input to the storage controller 1200 by using a symmetric-key algorithm.

The host interface circuit HI may transmit and receive a packet to and from the host device 10. The packet transmitted from the host device 10 to the host interface circuit HI may include a command, a request, or data to be written to the NVM device 1300. The packet transmitted from the host interface circuit HI to the host device 10 may include a response to a command or data read from the NVM device 1300.

The NVM interface circuit MI may transmit, to the NVM device 1300, data to be written to the NVM device 1300, or may receive data read from the NVM device 1300. The NVM interface circuit MI may be implemented to comply with standard protocols, such as Toggle or Open NAND Flash Interface (ONFI).

For example, as illustrated in FIG. 2, the first DMA engine 1220 and the second DMA engine 1260 may be implemented as separate hardware circuits. Although not illustrated, the first DMA engine 1220 and the second DMA engine 1260 may be implemented as a single hardware circuit and operated functionally separately from each other. For example, the first DMA engine 1220 may be a flash DMA (FDMA) engine. The second DMA engine 1260 may be a host DMA (HDMA) engine.

The first DMA engine 1220 may be a hardware device that controls a DMA operation between the buffer memory 1270 and the NVM device 1300 without intervention of the CPU 1240. The first DMA engine 1220 according to an embodiment may be a hardware device that controls a DMA operation between the host device 10 and the NVM device 1300. The second DMA engine 1260 may be a hardware device that controls a DMA operation between the host device 10 and the buffer memory 1270 without intervention of the CPU 1240.

For example, the storage device 1100 may operate in a DMA mode so as to improve a data transmission rate. The DMA mode is an operation mode in which data is transmitted under the control of the first and second DMA engines 1220 and 1260, with or without intervention of the CPU 1240 (or the processor, the core, etc.) included in the storage controller 1200. That is, because the control or processing by the CPU 1240 is not required while data is being transmitted, a data transmission rate may be improved.

In the DMA mode, the first DMA engine 1220 may control or manage data transmission between the buffer memory 1270 and the NVM device 1300, the first DMA engine 1220 may control or manage data transmission between the host device 10 and the NVM device 1300, and the second DMA engine 1260 may control or manage data transmission between the buffer memory 1270 and the host device 10.

In an embodiment, the first DMA engine 1220 may be configured to, when the storage controller 1200 receives a read request from the host device 10, read, from the NVM device 1300, read data (i.e., data corresponding to an address included in the read request) without control of the CPU 1240 and store the read data in the buffer memory 1270. After the read data is stored in the buffer memory 1270, the second DMA engine 1260 may be configured to read the read data stored in the buffer memory 1270 and transmit the read data to the host device 10 without control of the CPU 1240.

In an embodiment, the first DMA engine 1220 may be configured to, when the storage controller 1200 receives the read request from the host device 10, read the read data from the NVM device 1300 and transmit the read data to the host device 10 without control of the CPU 1240. The first DMA engine 1220 may transmit the read data to a virtual address corresponding to the read data. The address manager 1210 may translate the virtual address to a host address corresponding to the read data and transmit the read data to the host device 10.

Hereinafter, for convenience of explanation, embodiments are described based on the read operation of the storage device 1100 in response to the read request from the host device 10. In addition, the operation performed by the first DMA engine 1220 during the read operation, that is, the operation of reading data from the NVM device 1300 and transmitting the read data to the virtual address is referred to as a "first DMA operation." The operation performed by the first DMA engine 1220 during the read operation, that is, the operation of reading data from the NVM device 1300 and writing the read data to the buffer memory 1270 is referred to as a "second DMA operation." The operation performed by the first DMA engine 1220 during the read operation, that is, the operation of reading data from the NVM device 1300, transmitting the read data to the virtual address, and writing the read data to the buffer memory 1270 is referred to as a "third DMA operation."

For example, the CPU 1240 may perform initial settings for the first DMA engine 1220 so as to perform the first to third DMA operations. The CPU 1240 may perform initial settings for the second DMA engine 1260 so as to perform a DMA operation. Each of the first DMA engine 1220 and the second DMA engine 1260 may perform a DMA operation according to the initial settings of the CPU 1240. For example, the initial settings performed by the CPU 1240 refer to an operation of inputting or setting a target address, an address size, an input/output (I/O) device, a number, I/O information, etc. to or for the first DMA engine 1220 and the second DMA engine 1260.

The storage controller 1200 may perform initial settings for the first DMA engine 1220 and the second DMA engine 1260 in response to the read request. For example, the CPU 1240 of the storage controller 1200 may perform initial settings for the first DMA engine 1220 and the second DMA engine 1260 for the purpose of DMA operations.

In an embodiment, the address manager 1210 may generate mode information MINFO and transmit the mode information MINFO to the first DMA engine 1220. The mode information MINFO may indicate information requesting the first DMA engine 1220 to perform one of the first to third DMA operations. For example, the mode information MINFO may indicate one of first to third modes M1 to M3. The first mode M1 may refer to a mode in which the first DMA engine 1220 performs the first DMA operation. The second mode M2 may refer to a mode in which the first DMA engine 1220 performs the second DMA operation. The third mode M3 may refer to a mode in which the first DMA engine 1220 performs the third DMA operation.

In other words, the first mode M1 may refer to a mode in which the first DMA engine 1220 transmits the read data to the virtual address. That is, the first mode M1 may refer to a mode in which the read data is directly transmitted to the host device 10 without passing through the buffer memory 1270. The second mode M2 may refer to a mode in which the first DMA engine 1220 transmits the read data to the buffer memory 1270 (or a mode in which the read data is written to the buffer memory 1270). That is, the second mode M2 may refer to a mode in which the read data is transmitted to the host device 10 through the buffer memory 1270. The third mode M3 may refer to a mode in which the first DMA engine 1220 transmits the read data to the virtual address and simultaneously transmits the read data to the buffer memory 1270. That is, the third mode M3 may refer to a mode in which the read data is directly transmitted to the host device 10 without passing through the buffer memory 1270 and data is written to the buffer memory 1270.

In an embodiment, the ECC engine 1280 may perform an error correction operation on the read data read from the NVM device 1300. The ECC engine 1280 may generate the error-corrected read data. The first DMA engine 1220 may transmit the read data to the virtual address. The first DMA engine 1220 may transmit the error-corrected read data to the virtual address. Alternatively, the first DMA engine 1220 may write the error-corrected read data to the buffer memory 1270. That is, the read data transmitted by the first DMA engine 1220 may be read data that is error-corrected by the ECC engine 1280.

As described above, the storage controller 1200 may directly transmit, to the host device 10, the read data stored in the NVM device 1300 without passing through the buffer memory 1270. The storage controller 1200 may not allocate buffer resources with respect to the read request in the first mode M1. That is, the storage controller 1200 may not allocate an area of the buffer memory 1270 with respect to the read request. Read latency may be not associated with whether the resources of the buffer memory 1270 are sufficient. The storage device 1100 with reduced read latency and improved performance is provided.

Figure 3:
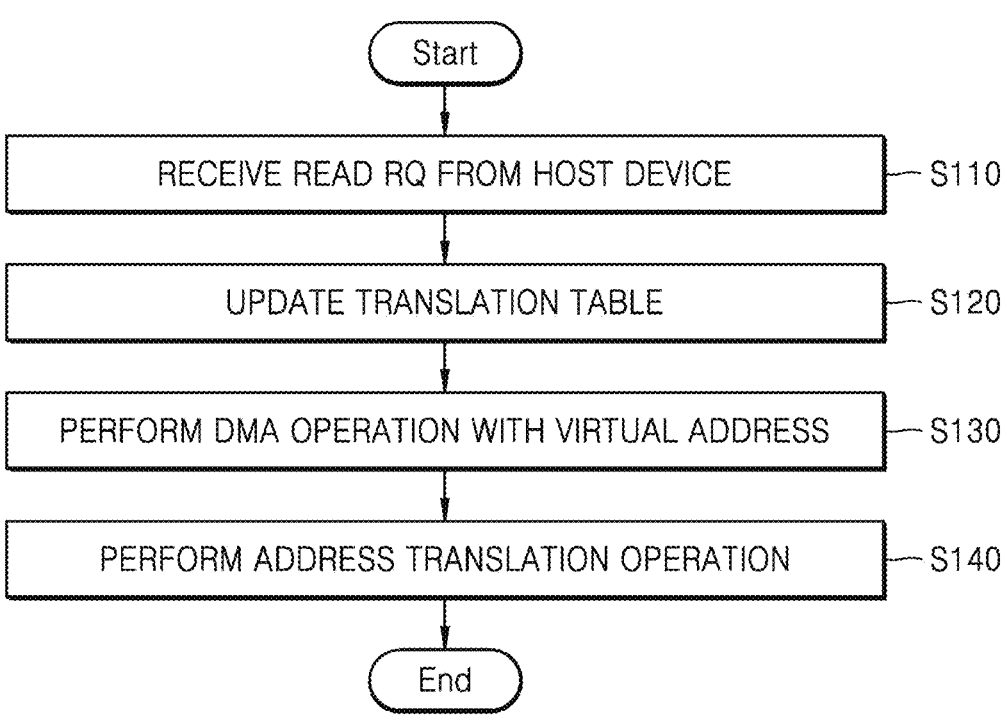
FIG. 3 is a flowchart illustrating an example of an operating method of a storage controller, according to an embodiment.

FIG. 3 is a flowchart illustrating an example of an operating method of the storage controller 1200, according to an embodiment.

Referring to FIGS. 2 and 3, in operation S110, the storage controller 1200 may receive a read request from the host device 10. For example, the read request may include a host address where read data read from the NVM device 1300 is to be stored. The host address may indicate an area of the host memory 12 allocated in relation to the read request. The host interface circuit HI may receive, from the host device 10, the read request including the host address.

In operation S120, the storage controller 1200 may update a TT. The storage controller 1200 may allocate a command identifier to the read request. The storage controller 1200 may store mapping information about the command identifier and the host address in the TT. For example, the address manager 1210 may store the mapping information about the host address and the command identifier corresponding to the read request in the TT in response to the read request.

In operation S130, the storage controller 1200 may perform a DMA operation with a virtual address. The storage controller 1200 may not write, to the buffer memory 1270, the read data read from the NVM device 1300. The storage controller 1200 may transmit the read data to the virtual address. That is, the first DMA engine 1220 may set a destination address of the read data corresponding to the read request to the virtual address corresponding to the command identifier and may transmit, to the virtual address, the read data corresponding to the read request.

In operation S140, the storage controller 1200 may perform an address translation operation. The storage controller 1200 may translate the destination address of the read data from the virtual address to the host address. That is, the address manager 1210 may translate the destination address of the read data from the virtual address to the host address based on the TT. The storage controller 1200 may translate the destination address of the read data to the host address and transmit the read data to the host device 10. The storage controller 1200 may write the read data to the host address.

Figure 4A:
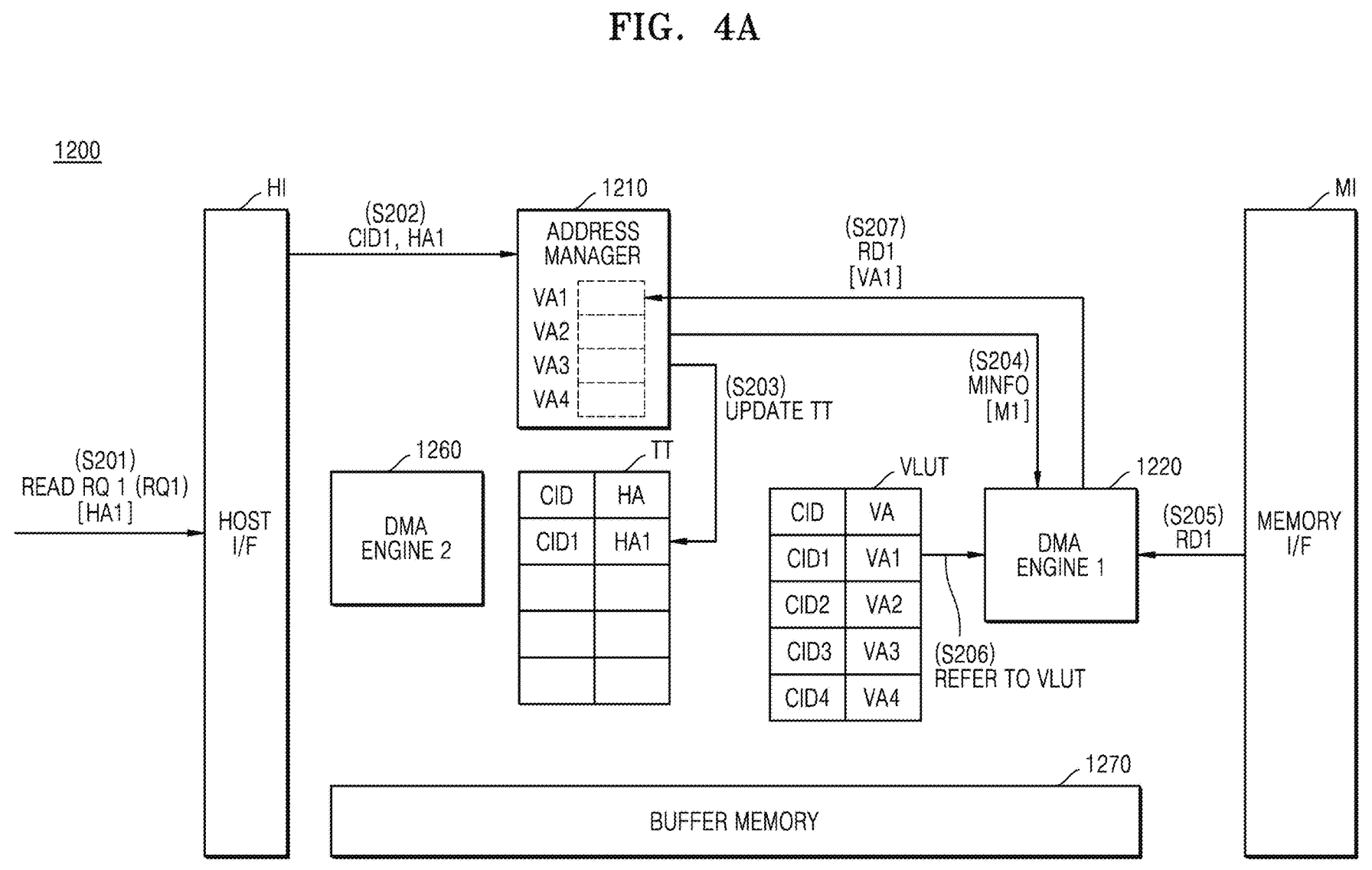
Figure 4B:
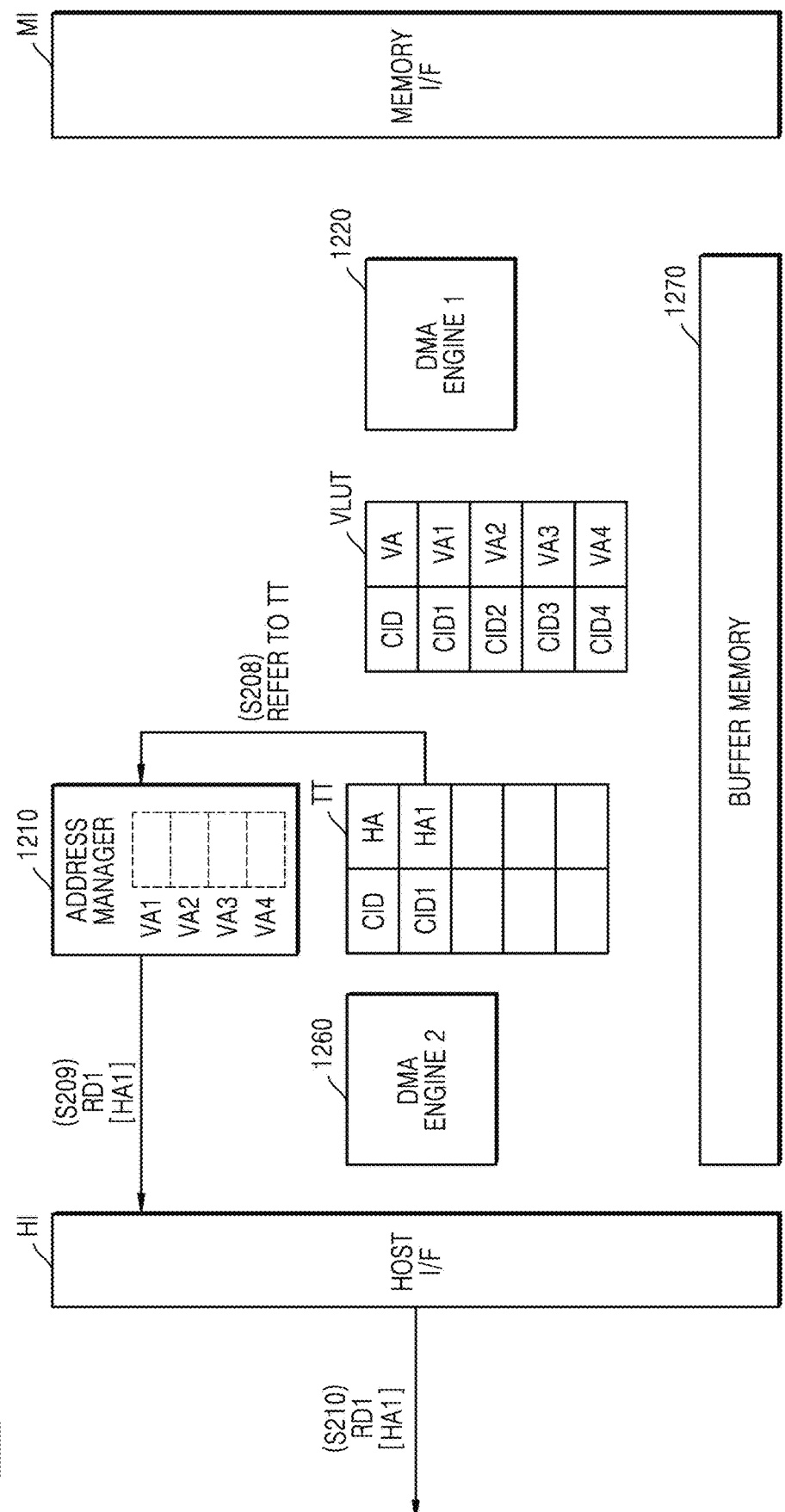

FIGS. 4A and 4B are diagrams for describing an operating method of the storage controller 1200, according to an embodiment.

In an embodiment, the storage controller 1200 may generate a VLUT in an initialization operation. The storage controller 1200 may allocate virtual addresses to command identifiers. Referring to the VLUT, a first command identifier CID1 may correspond to a first virtual address VA1, a second command identifier CID2 may correspond to a second virtual address VA2, a third command identifier CID3 may correspond to a third virtual address VA3, and a fourth command identifier CID4 may correspond to a fourth virtual address VA4.

Referring to FIGS. 1, 4A, and 4B, in operation S201, the host interface circuit HI of the storage controller 1200 may receive a first read request RQ1 from the host device 10. The first read request RQ1 may include a first host address HA1. The first host address HA1 may indicate an address of the host memory 12 where read data corresponding to the first read request RQ1 is to be stored. For example, the host address may be a physical region page (PRP) address of an NVMe standard protocol.

In operation S202, the host interface circuit HI may transmit the first command identifier CID1 and the first host address HA1 to the address manager 1210. In an embodiment, the storage controller 1200 may allocate a command identifier (or a descriptor, a tag, etc.) to the first read request RQ1. For example, because the command identifiers are respectively allocated to the commands, the command identifiers may be unique information that allows the storage controller 1200 to distinguish between the commands. The storage controller 1200 may allocate the first command identifier CID1 to the first read request RQ1. The host interface circuit HI may transmit the first command identifier CID1 and the first host address HA1 to the address manager 1210 in relation to the first read request RQ1.

In operation S203, the address manager 1210 may update the TT. The TT may include mapping information between the command identifier and the host address. The address manager 1210 may receive the first command identifier CID1 and the first host address HA1. The address manager 1210 may update the TT based on the first command identifier CID1 and the first host address HA1. The address manager 1210 may store the corresponding host address in the TT in relation to the command identifier. For example, the address manager 1210 may store the first host address HA1 in the TT in relation to the first command identifier CID1.

In operation S204, the address manager 1210 may transmit mode information MINFO to the first DMA engine 1220. The address manager 1210 may generate the mode information MINFO. The address manager 1210 may determine (e.g., choose/select) to process the first read request RQ1 by performing the first DMA operation. For example, when the resources of the buffer memory 1270 are insufficient, the address manager 1210 may instruct the first DMA engine 1220 to perform the first DMA operation.

The address manager 1210 may generate the mode information MINFO indicating the first mode M1 so that the first DMA engine 1220 performs the first DMA operation. The address manager 1210 may transmit, to the first DMA engine 1220, the mode information MINFO indicating the first mode M1. For example, the first mode M1 may refer to a mode in which the read data is transmitted to the virtual address without writing the read data to the buffer memory 1270.

The first DMA engine 1220 may receive the mode information MINFO. The first DMA engine 1220 may perform the DMA operation based on the mode information MINFO. The first DMA engine 1220 may perform the first DMA operation in response to the mode information MINFO indicating the first mode M1. The first DMA engine 1220 may transmit, to the virtual address, the read data read from the NVM device 1300.

In operation S205, the first DMA engine 1220 may receive the read data from the NVM memory interface circuit MI. The first DMA engine 1220 may read the read data (i.e., the first read data RD1) corresponding to the first read request RQ1 from the NVM device 1300 through the NVM memory interface circuit MI.

The storage controller 1200 may transmit, to the NVM device 1300, the read command for the read data corresponding to the first read request RQ1. The NVM device 1300 may output the first read data RD1 to the storage controller 1200 in response to the read command. The storage controller 1200 may receive the first read data RD1.

In operation S206, the first DMA engine 1220 may refer to the VLUT. The VLUT may include mapping information between the command identifier and the virtual address. Because the mode information MINFO indicates the first mode M1, the first DMA engine 1220 may transmit the first read data RD1 to the virtual address. The first DMA engine 1220 may determine (e.g., identify/select) the virtual address by referring to the VLUT.

The first DMA engine 1220 may refer to the VLUT based on the command identifier corresponding to the first read data RD1. The first DMA engine 1220 may retrieve the virtual address corresponding to the first command identifier CID1 by referring to the VLUT. The first DMA engine 1220 may retrieve the first virtual address VA1 corresponding to the first command identifier CID1. The first DMA engine 1220 may set the first virtual address VA1 corresponding to the first command identifier CID1 as the destination address of the first read data RD1.

In operation S207, the first DMA engine 1220 may transmit the read data to the virtual address. The first DMA engine 1220 may transmit the first read data RD1 to the first virtual address VA1. The bus BUS (FIG. 2) may determine whether the destination address is within the virtual address range. When the destination address is within the virtual address range, the bus BUS may route packets (or data) to the address manager 1210. The bus BUS may route, to the address manager 1210, the first read data RD1 transmitted by the first DMA engine 1220. That is, the first DMA engine 1220 may set the destination address of the first read data RD1 to the first virtual address VA1 and transmit the first read data RD1 to the address manager 1210. The address manager 1210 may receive the first read data RD1.

In operation S208 (FIG. 4B), the address manager 1210 may refer to the TT. The address manager 1210 may perform an address translation operation by referring to the TT. The address manager 1210 may translate the destination address of the first read data RD1 from the virtual address to the host address by referring to the TT. The address manager 1210 may determine the host address by referring to the TT.

The address manager 1210 may refer to the TT based on the identifier corresponding to the first read data RD1. The address manager 1210 may retrieve the host address corresponding to the first command identifier CID1 by referring to the TT. The address manager 1210 may retrieve the first host address HA1 corresponding to the first command identifier CID1. The address manager 1210 may translate the destination address of the first read data RD1 from the first virtual address VA1 to the first host address HA1.

In operation S209, the address manager 1210 may transmit the first read data RD1 to the host interface circuit HI. The address manager 1210 may set the destination address of the first read data RD1 to the first host address HA1 and transmit the first read data RD1 to the host interface circuit HI.

In operation S210, the host interface circuit HI may transmit the read data to the host device 10. The host interface circuit HI may transmit the first read data RD1 to the first host address HA1 indicating an area allocated to the host memory 12.

As described above, the storage controller 1200 may directly transmit, to the host device 10, the read data read from the NVM device 1300 without storing the read data in the buffer memory 1270. The first DMA engine 1220 of the storage controller 1200 may transmit, to the virtual address, the read data read from the NVM device 1300, and then, the address manager 1210 may translate the destination address of the read data from the virtual address to the host address and transmit the read data to the host device 10. By passing (or bypassing) the buffer memory 1270 and directly transmitting, to the host device 10, the read data read from the NVM device 1300, read latency may be reduced and performance of the storage device 1100 may be improved.

FIG. 5 is a flowchart illustrating an example of an operating method of the storage controller 1200, according to an embodiment.

Referring to FIGS. 2, 3, and 5, in an embodiment, operation S130 of FIG. 3 may include operations S131 to S137. In operation S120 of FIG. 3, the storage controller 1200 may update the TT. Subsequently, in operation S125, the storage controller 1200 may transmit the mode information MINFO to the first DMA engine 1220. The storage controller 1200 may determine (e.g., choose/select) one of the first to third DMA operations. The storage controller 1200 may generate the mode information MINFO indicating one of the first to third modes M1 to M3.

For example, the storage controller 1200 may determine whether to allow the first DMA engine 1220 to transmit the read data to the virtual address without writing, to the buffer memory 1270, the read data read from the NVM device 1300. Alternatively, the storage controller 1200 may determine whether to allow the first DMA engine 1220 to write the read data to the buffer memory 1270, allow the second DMA engine 1260 to read the read data from the buffer memory 1270, and determine whether to transmit the read data to the host device 10. Alternatively, the storage controller 1200 may determine whether to transmit the read data to the virtual address and write the read data to the buffer memory 1270.

In operation S131, the storage controller 1200 may determine whether the mode information MINFO indicates the first mode M1. The storage controller 1200 may perform operation S132 when the mode information MINFO indicates the first mode M1, and may perform operation S133 when the mode information MINFO does not indicate the first mode M1.

In operation S132, the storage controller 1200 may transmit the read data to the virtual address. Because the mode information MINFO indicates the first mode M1, the storage controller 1200 may not write the read data to the buffer memory 1270. The storage controller 1200 may retrieve the virtual address corresponding to the command identifier by referring to the virtual look-up table VLUT. The storage controller 1200 may transmit the read data to the virtual address corresponding to the command identifier. Subsequently, the storage controller 1200 may perform operation S140. The storage controller 1200 may perform an address translation operation and transmit the read data to the host address.

In operation S133, the storage controller 1200 may determine whether the mode information MINFO indicates the second mode M2. The storage controller 1200 may perform operation S134 when the mode information MINFO indicates the second mode M2, and may perform operation S135 when the mode information MINFO does not indicate the second mode M2.

In operation S134, the storage controller 1200 may transmit the read data to the buffer memory 1270. The storage controller 1200 may transmit the read data to the physical address of the buffer memory 1270. The storage controller 1200 may transmit the read data to an area of the buffer memory 1270 allocated for the read data. The storage controller 1200 may write the read data to the buffer memory 1270. Subsequently, the second DMA engine 1260 of the storage controller 1200 may read the read data from the buffer memory 1270. The second DMA engine 1260 may transmit the read data to the host address. The second DMA engine 1260 may transmit the read data to the host device 10.

In operation S135, the storage controller 1200 may determine whether the mode information MINFO indicates the third mode M3. The storage controller 1200 may perform operation S136 when the mode information MINFO indicates the third mode M3, and may perform operation S137 when the mode information MINFO does not indicate the third mode M3.

In operation S136, the storage controller 1200 may transmit the read data to the virtual address and transmit the read data to the buffer memory 1270. Because the mode information MINFO indicates the third mode M3, the storage controller 1200 may write the read data to the buffer memory 1270 and transmit the read data to the virtual address. To reduce the latency of the read request, the storage controller 1200 may transmit the read data to the virtual address. To reduce the expected latency of the read request, the storage controller 1200 may transmit the read data to the buffer memory 1270.

The host device 10 may repeatedly request the read data for the same address. When the read request for the same address is repeated, the storage device 1100 may write, to the buffer memory 1270, data corresponding to the read request so as to increase a hit ratio. The storage device 1100 may provide data stored in the buffer memory 1270 to the host device 10 in response to a new read request. Instead of reading data from the NVM device 1300 and providing the read data to the host device 10, the storage device 1100 may directly provide the data stored in the buffer memory 1270 to the host device 10. Accordingly, the storage device 1100 may reduce read latency.

The storage controller 1200 may perform operation S140 after operation S136. The storage controller 1200 may perform an address translation operation and transmit the read data to the host address. In operation S137, the storage controller 1200 may handle an error. Because the mode information MINFO indicates an invalid mode, an error may be handled.

As described above, the first DMA engine 1220 may determine which mode among the first to third modes M1 to M3 the mode information MINFO indicates. When the first DMA engine 1220 determines that the mode information MINFO indicates the first mode M1, the first DMA engine 1220 may set the destination address of the read data to the virtual address corresponding to the command identifier and transmit the read data to the virtual address. When the first DMA engine 1220 determines that the mode information MINFO indicates the second mode M2, the first DMA engine 1220 may set the destination address of the read data to the address of the buffer memory 1270 and transmit the read data to the address of the buffer memory 1270. When the first DMA engine 1220 determines that the mode information MINFO indicates the third mode M3, the first DMA engine 1220 may transmit the read data to the virtual address and transmit the read data to the address of the buffer memory 1270.

Figure 6A:
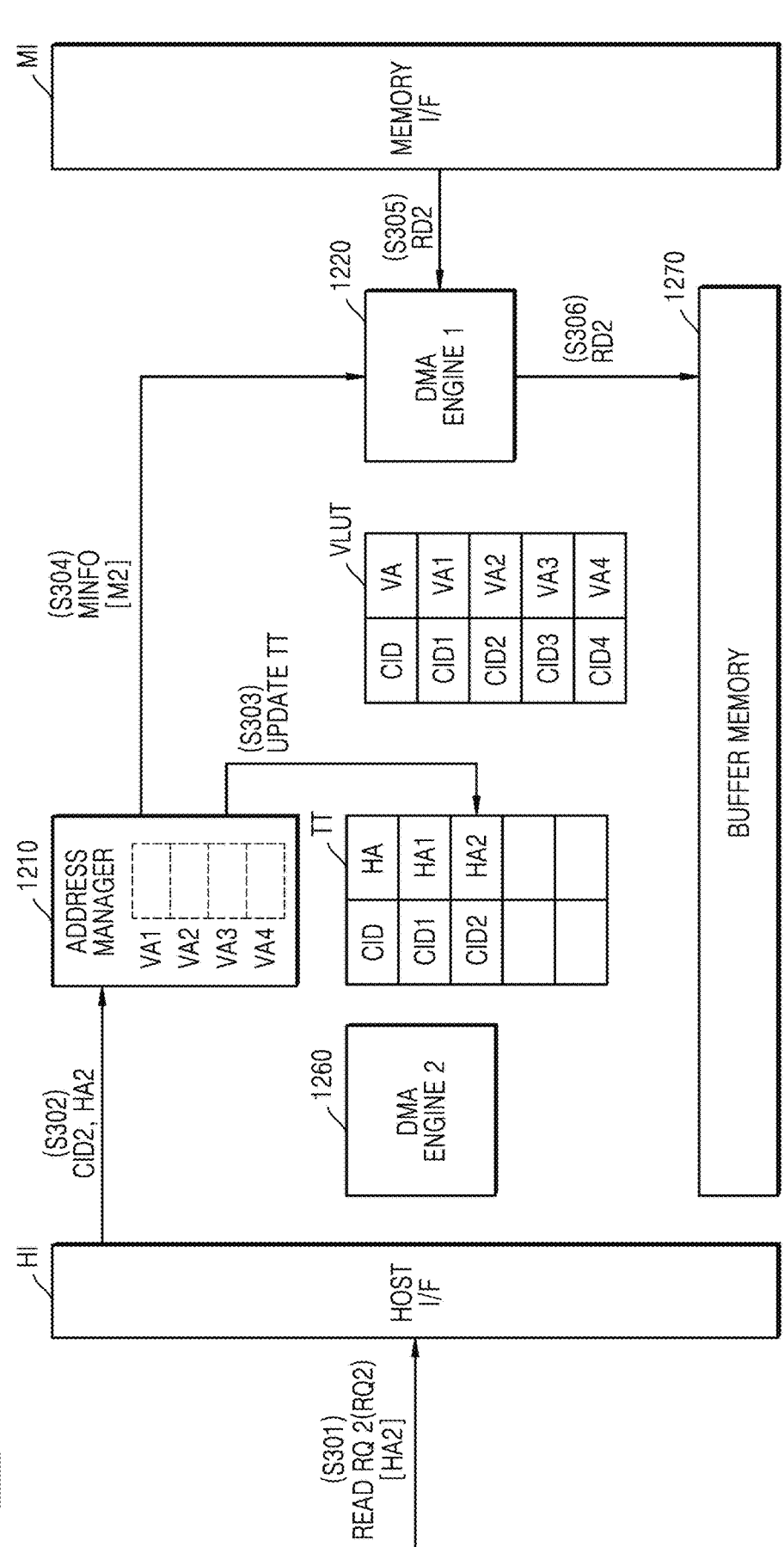
FIGS. 6A and 6B are diagrams for describing an operating method of a storage controller, according to an embodiment.
Figure 6B:
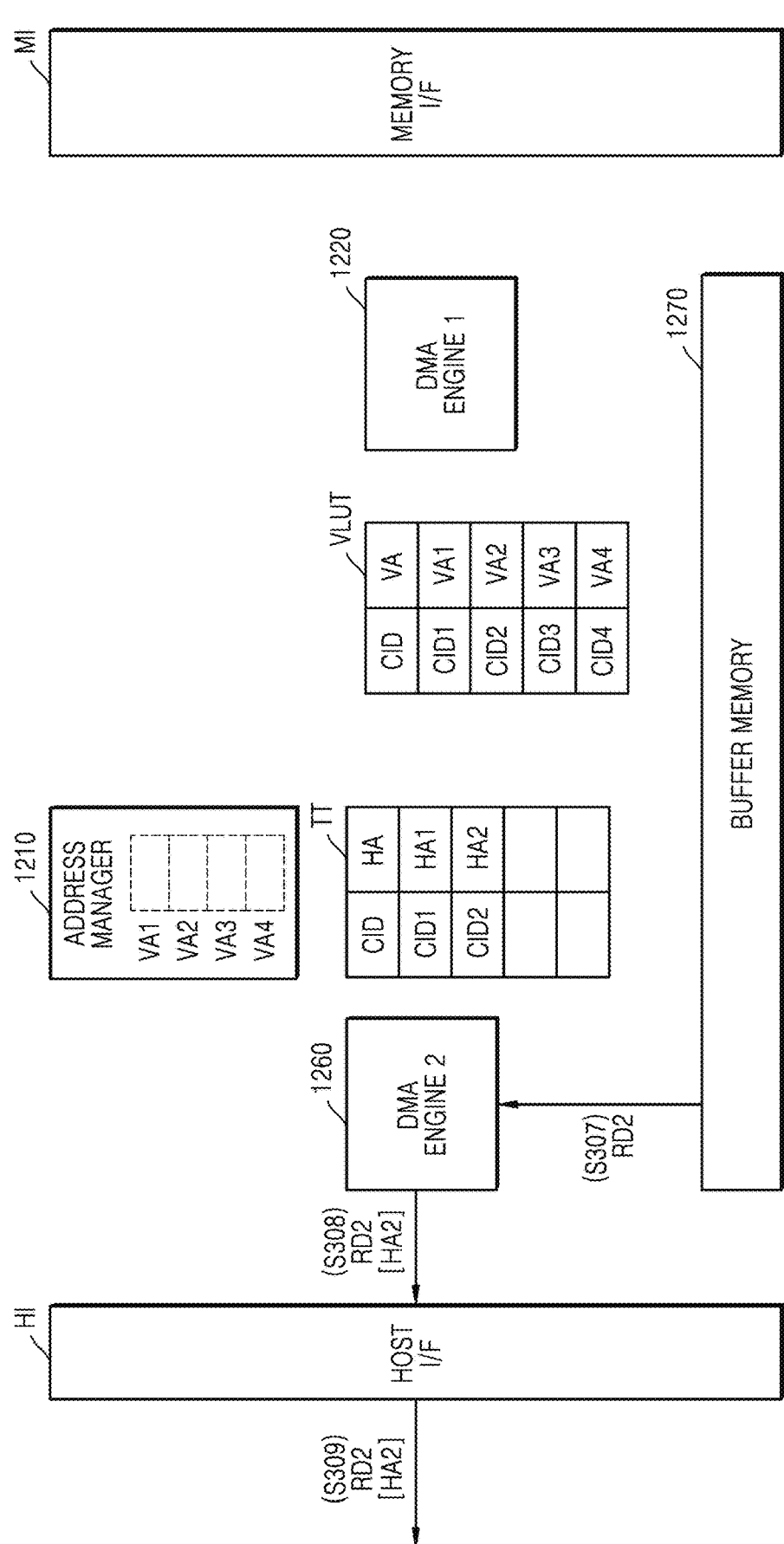

FIGS. 6A and 6B are diagrams for describing an operating method of the storage controller 1200, according to an embodiment.

Referring to FIGS. 2, 6A, and 6B, in operation S301, the storage controller 1200 may receive a second read request RQ2. The host interface circuit HI may receive the second read request RQ2. The second read request RQ2 may include a second host address HA2.

In operation S302, the host interface circuit HI may transmit a second command identifier CID2 and the second host address HA2 to the address manager 1210. The storage controller 1200 may allocate the second command identifier CID2 to the second read request RQ2. The host interface circuit HI may transmit the second command identifier CID2 and the second host address HA2 to the address manager 1210.

In an embodiment, the host interface circuit HI may transmit only the second command identifier CID2 to the address manager 1210. The address manager 1210 may retrieve a host address corresponding to the second command identifier CID2 by referring to a descriptor table (not shown). The address manager 1210 may determine the host address corresponding to the second read request RQ2 in the descriptor table, based on the second command identifier CID2. The address manager 1210 may retrieve the second host address HA2 in the descriptor table.

In operation S303, the address manager 1210 may update the TT. The address manager 1210 may receive the second command identifier CID2 and the second host address HA2. The address manager 1210 may update the TT based on the second command identifier CID2 and the second host address HA2. The address manager 1210 may store the second host address HA2 in the TT in relation to the second command identifier CID2.

In an embodiment, the address manager 1210 may omit operation S303. The address manager 1210 may not perform operation S303. When the address manager 1210 determines to process the second read request RQ2 by performing the second DMA operation, the address manager 1210 may not perform operation S303.

In operation S304, the address manager 1210 may transmit mode information MINFO to the first DMA engine 1220. The address manager 1210 may determine/select to process the second read request RQ2 by performing the second DMA operation. The address manager 1210 may generate the mode information MINFO indicating the second mode M2 so that the first DMA engine 1220 performs the second DMA operation. The address manager 1210 may transmit, to the first DMA engine 1220, the mode information MINFO indicating the second mode M2. The second mode M2 may refer to a mode in which the read data is written to the buffer memory 1270.

The first DMA engine 1220 may receive the mode information MINFO indicating the second mode M2. The first DMA engine 1220 may perform the second DMA operation in response to the mode information MINFO indicating the second mode M2. The first DMA engine 1220 may transmit, to the buffer memory 1270, the read data read from the NVM device 1300.

In operation S305, the first DMA engine 1220 may receive the read data from the NVM memory interface circuit MI. The first DMA engine 1220 may read the read data (i.e., the second read data RD2) corresponding to the second read request RQ2 from the NVM device 1300 through the NVM memory interface circuit MI.

In operation S306, the first DMA engine 1220 may transmit the second read data RD2 to the buffer memory 1270. The first DMA engine 1220 may write the second read data RD2 to an area allocated to the buffer memory 1270.

The first DMA engine 1220 may transmit the second read data RD2 to the physical address of the buffer memory 1270.

In operation S307 (FIG. 6B), the second DMA engine 1260 may read (e.g., load) the second read data RD2 from the buffer memory 1270. The second DMA engine 1260 may read the second read data RD2 stored in the buffer memory 1270. The second DMA engine 1260 may receive the second read data RD2 from the buffer memory 1270.

In operation S308, the second DMA engine 1260 may transmit the second read data RD2 to the host interface circuit HI. The second DMA engine 1260 may set the destination address of the second read data RD2 to the second host address HA2 and transmit the second read data RD2 to the host interface circuit HI.

In operation S309, the host interface circuit HI may transmit the second read data RD2 to the host device 10. The host interface circuit HI may transmit the second read data RD2 to the second host address HA2 indicating an area allocated to the host memory 12.

As described above, the storage controller 1200 may process the read request by performing the second DMA operation. That is, in the second mode M2, the storage controller 1200 may write, to the buffer memory 1270, the read data read from the NVM device 1300, may read the read data stored in the buffer memory 1270, and may transmit the read data to the host device 10.

In the second mode M2, the storage controller 1200 may additionally perform an operation of writing data to the buffer memory 1270 and an operation of reading data from the buffer memory 1270, as compared to the first mode M1. That is, read latency in the second mode M2 may be greater than read latency in the first mode M1. In the second mode M2, read latency for the read request may further include a time to write data to the buffer memory 1270 and a time to read data from the buffer memory 1270.

In addition, the storage controller 1200 may allocate an area of the buffer memory 1270 to the read request (or the command identifier). Because the capacity of the buffer memory 1270 is limited, it may take time to allocate an area of the buffer memory 1270 for a new read request. Until available resources (e.g., the buffer memory 1270) are secured, read latency may increase and performance may deteriorate.

Figure 7B:
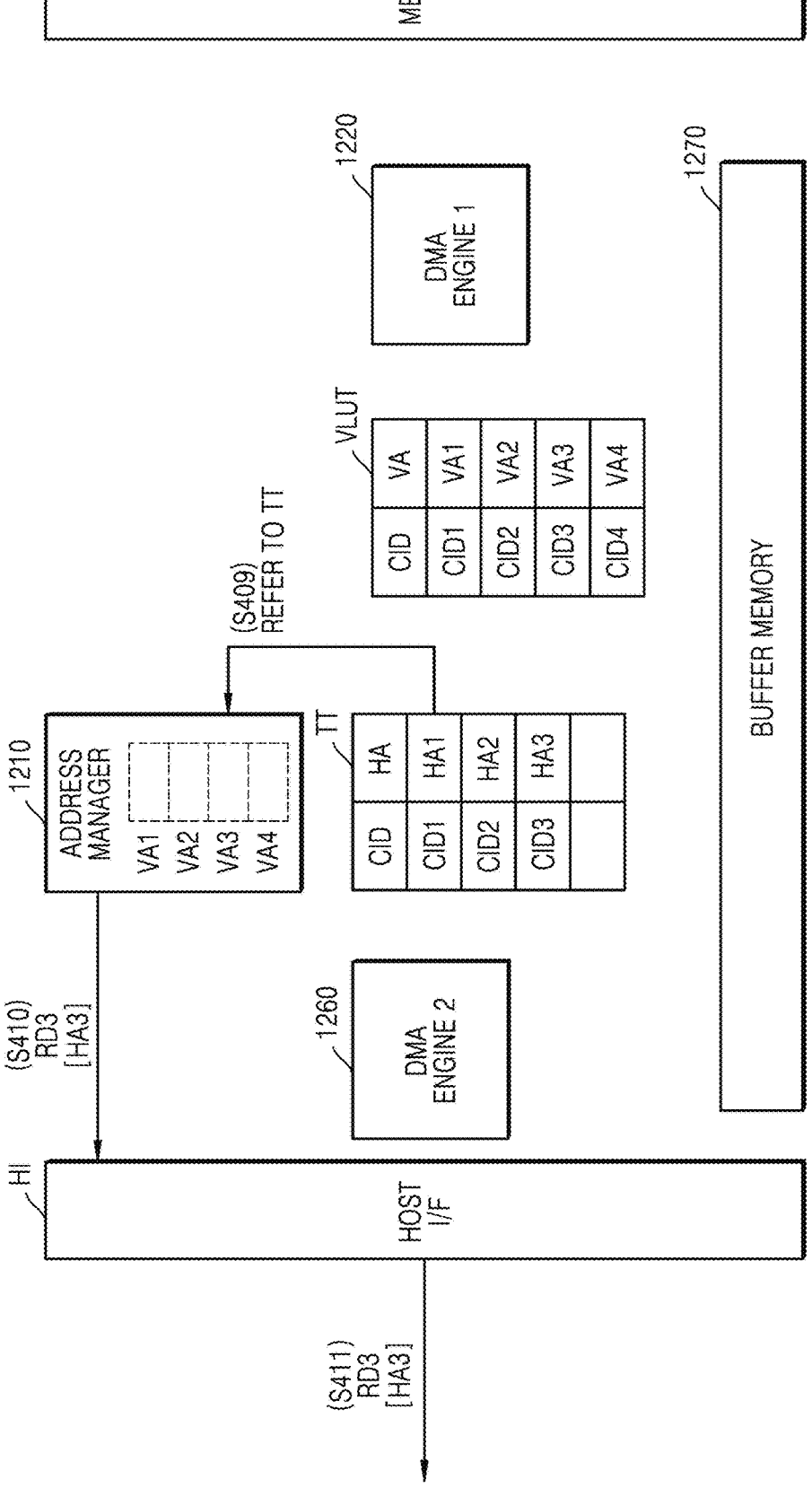

FIGS. 7A and 7B are diagrams for describing an operating method of the storage controller 1200, according to an embodiment.

Referring to FIGS. 2, 7A, and 7B, in operation S401, the storage controller 1200 may receive a third read request RQ3. The host interface circuit HI may receive the third read request RQ3. The third read request RQ3 may include a third host address HA3.

In operation S403, the host interface circuit HI may transmit a third command identifier CID3 and the third host address HA3 to the address manager 1210. The storage controller 1200 may allocate the third command identifier CID3 to the third read request RQ3. The host interface circuit HI may transmit the third command identifier CID3 and the third host address HA3 to the address manager 1210.

In operation S403, the address manager 1210 may update the TT. The address manager 1210 may receive the third command identifier CID3 and the third host address HA3. The address manager 1210 may update the TT based on the third command identifier CID3 and the third host address HA3. The address manager 1210 may store the third host address HA3 in the TT in relation to the third command identifier CID3.

In operation S404, the address manager 1210 may transmit mode information MINFO to the first DMA engine 1220. The address manager 1210 may determine (e.g., choose/select) to process the third read request RQ3 by performing the third DMA operation. The address manager 1210 may generate the mode information MINFO indicating the third mode M3 so that the first DMA engine 1220 performs the third DMA operation. The address manager 1210 may transmit, to the first DMA engine 1220, the mode information MINFO indicating the third mode M3. The third mode M3 may refer to a mode in which the read data is transmitted to the virtual address and the read data is written to the buffer memory 1270.

The first DMA engine 1220 may receive the mode information MINFO indicating the third mode M3. The first DMA engine 1220 may perform the third DMA operation in response to the mode information MINFO indicating the third mode M3. The first DMA engine 1220 may transmit, to the virtual address, the read data read from the NVM device 1300 and transmit the read data to the buffer memory 1270.

In operation S405, the first DMA engine 1220 may receive the read data from the NVM memory interface circuit MI. The first DMA engine 1220 may read the read data (i.e., the third read data RD3) corresponding to the third read request RQ3 from the NVM device 1300 through the NVM memory interface circuit MI.

In operation S406, the first DMA engine 1220 may refer to the VLUT. Because the mode information MINFO indicates the third mode M3, the first DMA engine 1220 may transmit the third read data RD3 to the virtual address. The first DMA engine 1220 may determine the virtual address by referring to the VLUT. The first DMA engine 1220 may retrieve a third virtual address VA3 corresponding to the third command identifier CID3 by referring to the VLUT. The first DMA engine 1220 may set the third virtual address VA3 corresponding to the third command identifier CID3 as the destination address of the third read data RD3.

In operation S407, the first DMA engine 1220 may transmit the read data to the virtual address. The first DMA engine 1220 may transmit the third read data RD3 to the third virtual address VA3. Because the third virtual address is included in the virtual address range. the bus BUS may route the third read data RD3 to the address manager 1210. That is, the first DMA engine 1220 may set the destination address of the third read data RD3 to the third virtual address VA3 and transmit the third read data RD3 to the address manager 1210. The address manager 1210 may receive the third read data RD3.

In operation S408, the first DMA engine 1220 may transmit the third read data RD3 to the buffer memory 1270. The first DMA engine 1220 may write the third read data RD3 to an area allocated to the buffer memory 1270. The first DMA engine 1220 may transmit the third read data RD3 to the physical address of the buffer memory 1270.

For brevity of drawings and convenience of explanation, operation S407 is illustrated as being performed before operation S408, but the scope of the inventive concept is not limited thereto. The operations may be performed simultaneously or may be performed in a different order.

In operation S409 (FIG. 7B), the address manager 1210 may refer to the TT. The address manager 1210 may perform an address translation operation by referring to the TT. The address manager 1210 may translate the destination address of the third read data RD3 from the third virtual address VA3 to the third host address HA3 by referring to the TT.

In operation S410, the address manager 1210 may transmit the third read data RD3 to the host interface circuit HI. The address manager 1210 may set the destination address of the third read data RD3 to the third host address HA3 and transmit the third read data RD3 to the host interface circuit HI.

In operation S411, the host interface circuit HI may transmit the read data to the host device 10. The host interface circuit HI may transmit the third read data RD3 to the third host address HA3 indicating an area allocated to the host memory 12.

As described above, the storage controller 1200 may process the read request by performing the third DMA operation. That is, in the third mode M3, the storage controller 1200 may directly transmit the read data to the host device 10 without passing through the buffer memory 1270. At the same time, the storage controller 1200 may store the read data in the buffer memory 1270. Accordingly, the storage controller 1200 may increase a hit rate for the host device 10 that repeatedly requests the read data for the same address. The storage device with reduced read latency and improved performance is provided.

Figure 8:
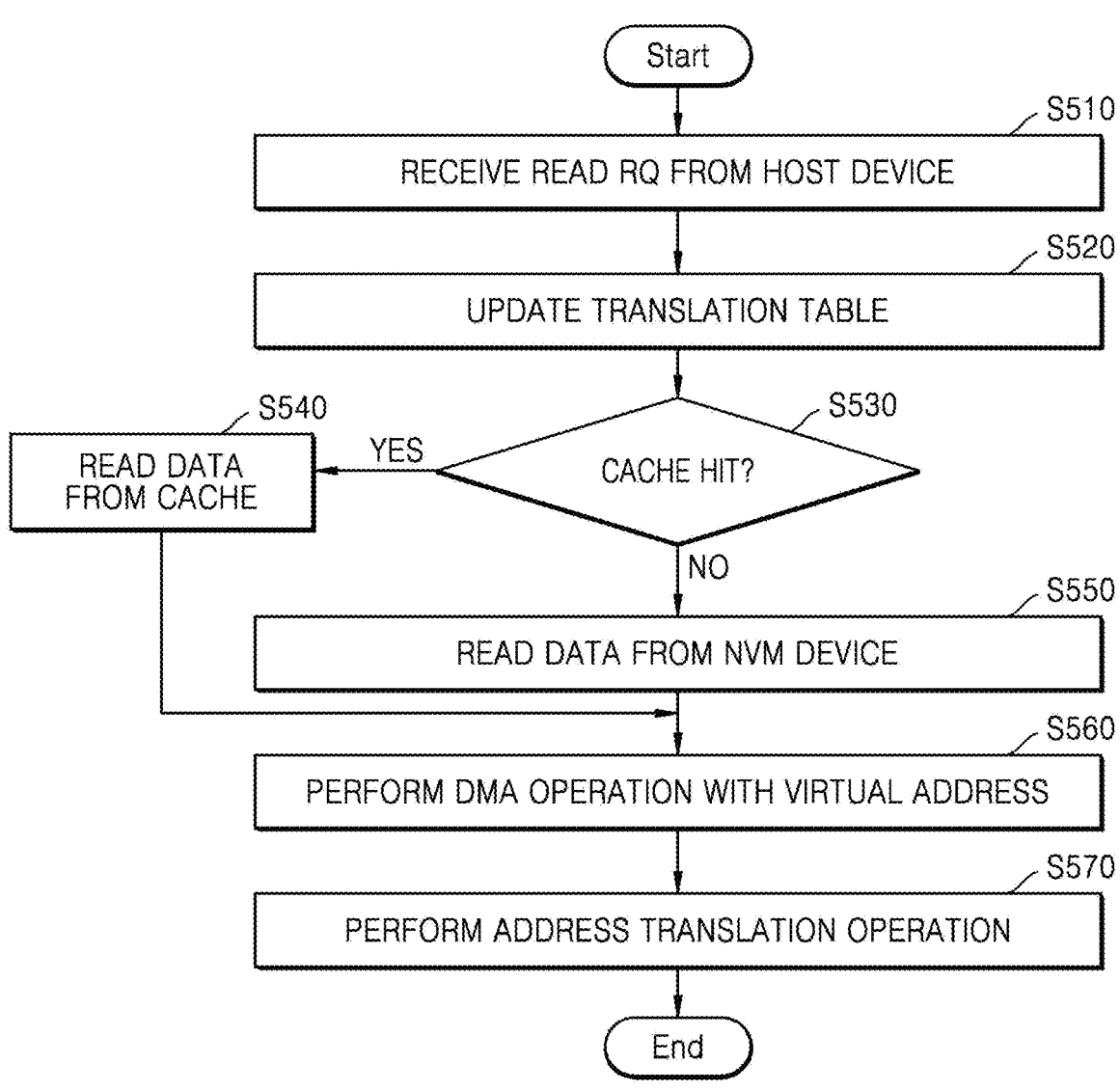
FIG. 8 is a flowchart illustrating an example of an operating method of a storage controller, according to an embodiment.

FIG. 8 is a flowchart illustrating an example of an operating method of the storage controller 1200, according to an embodiment.

Referring to FIGS. 2 and 8, in operation S510, the storage controller 1200 may receive a read request from the host device 10. In operation S520, the storage controller 1200 may update a TT. Because operations S510 and S520 are similar to operations S110 and S120 of FIG. 3, a detailed description thereof is omitted.

In operation S530, the storage controller 1200 (e.g., the cache manager 1230) may determine whether a cache hit has occurred. For example, the storage controller 1200 may determine whether data corresponding to the read request is present in a cache (or a cache memory). The cache hit may refer to a case where read data corresponding to the read request is present in the cache. A cache miss may refer to a case where read data corresponding to the read request is not present in the cache. When the storage controller 1200 determines that the cache hit has occurred, the storage controller 1200 may perform operation S540, and when the storage controller 1200 determines that the cache miss has occurred, the storage controller 1200 may perform operation S550.

In operation S540, the storage controller 1200 may read data from the cache. The storage controller 1200 (e.g., the cache manager 1230) may load the data stored in the cache. In an embodiment, the storage controller 1200 may determine whether the read data is cached in a sub-buffer. When the read data is cached in the sub-buffer, the storage controller 1200 may load the read data from the sub-buffer.

In an embodiment, the storage controller 1200 may determine whether the read data is cached in the latch 1331 of the NVM device 1300. When the read data is cached in the NVM device 1300, the storage controller 1200 may load the read data from the NVM device 1300.

In operation S550, the storage controller 1200 may read data from the NVM device 1300. The storage controller 1200 (e.g., the NVM interface circuit MI) may read data from the memory cell array of the NVM device 1300. The storage controller 1200 may receive read data after a reference time (tR) has elapsed from a time point when a read command is transmitted to the NVM device 1300.

In operation S560, the storage controller 1200 may perform a DMA operation with a virtual address. In operation S570, the storage controller 1200 may perform an address translation operation. Because operations S560 and S570 are similar to operations S130 and S140 of FIG. 3, a detailed description thereof is omitted.

As described above, the storage controller 1200 may implement the cache with the sub-buffer and the latch 1331 of the NVM device 1300. When the storage controller 1200 determines that the cache hit has occurred, the storage controller 1200 may load data from the cache in response to the read request. Accordingly, the storage device 1100 with reduced read latency and improved performance is provided.

Figure 9:
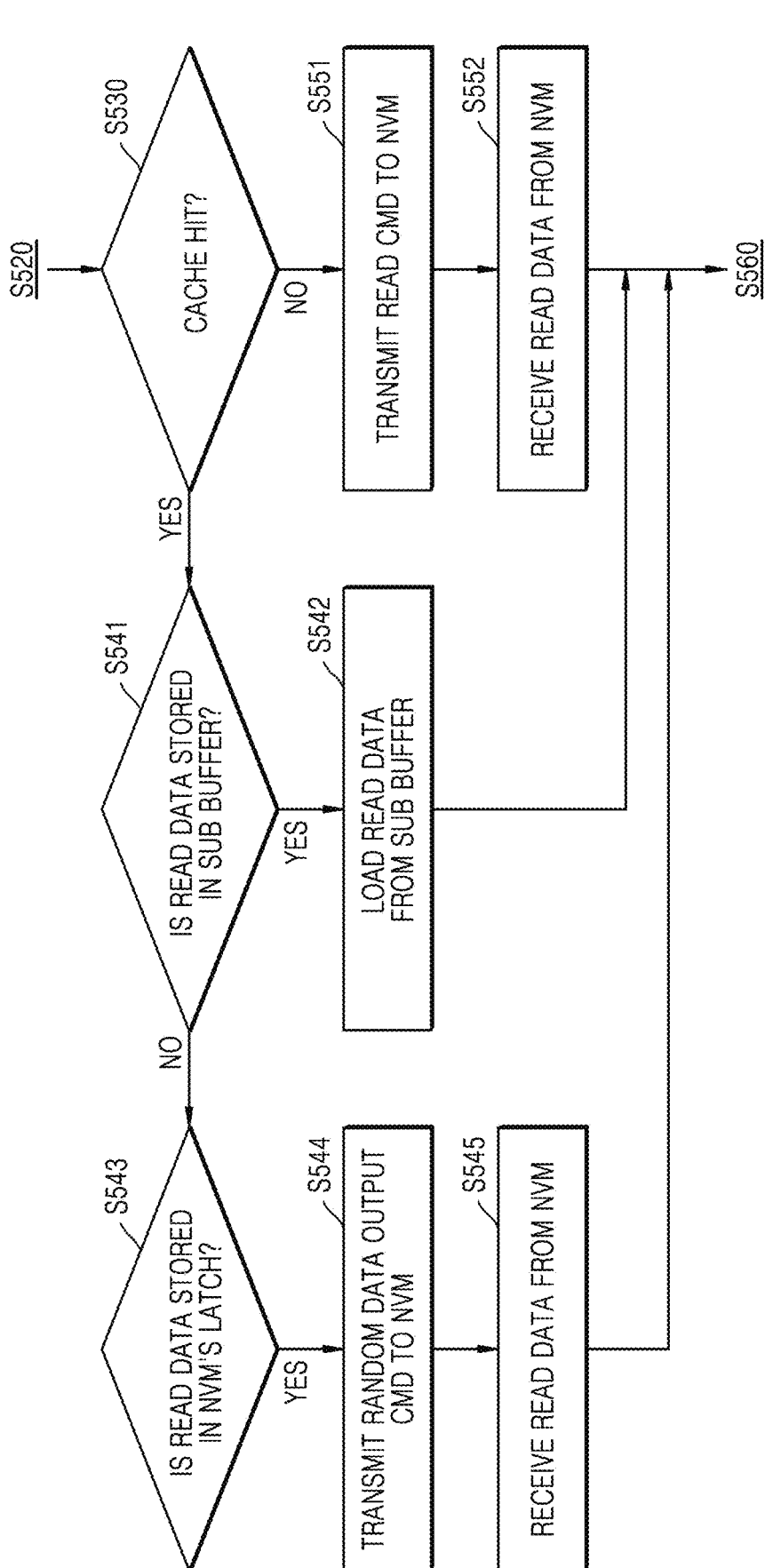
FIG. 9 is a flowchart illustrating an example of an operating method of a storage controller, according to an embodiment.

FIG. 9 is a flowchart illustrating an example of an operating method of the storage controller 1200, according to an embodiment.

Referring to FIGS. 2, 8, and 9, in operation S520, the storage controller 1200 may update the TT. In operation S530, the storage controller 1200 may determine whether the cache hit has occurred. For example, the cache manager 1230 may determine whether data is present in the cache memory. When the storage controller 1200 determines that the cache hit has occurred, the storage controller 1200 may perform operation S541, and when the storage controller 1200 determines that the cache miss has occurred, the storage controller 1200 may perform operation S551. In an embodiment, operation S540 may include operations S541 to S545, and operation S550 may include operations S551 and S552.

In operation S541, the storage controller 1200 may determine whether the read data is stored in the sub-buffer of the storage controller 1200. The cache manager 1230 may determine whether the read data is cached in the sub-buffer. The sub-buffer may be a memory that is different from the buffer memory.

In an embodiment, the storage controller 1200 may further include a sub-buffer. It is assumed that the sub-buffer is SRAM. However, the scope of the inventive concept is not limited thereto. For example, the sub-buffer memory may include high-speed RAM, such as DRAM or SDRAM. Alternatively, the buffer memory 1270 may include an NVM, such as ROM, PROM, EPROM, EEPROM, flash memory, PRAM, MRAM, RRAM, FRAM, or TRAM. For example, the sub-buffer may be a memory that is used by the ECC engine 1280. The sub-buffer may be LDPC SRAM.

When the storage controller 1200 determines that the read data is stored (e.g., cached) in the sub-buffer, the storage controller 1200 may perform operation S542, and when the storage controller 1200 determines that the read data is not stored in the sub-buffer, the storage controller 1200 may perform operation S543.

In operation S542, the storage controller 1200 may load the read data from the sub-buffer. The storage controller 1200 may not transmit the read command to the NVM device 1300. The storage controller 1200 may not receive the read data from the NVM device 1300. The storage controller 1200 may read the read data stored in the sub-buffer. Subsequently, the storage controller 1200 may perform operation S560.

In operation S543, the storage controller 1200 may determine whether data is stored in the latch 1331 of the NVM device 1300. When the storage controller 1200 determines that the read data is stored in the latch 1331, the storage controller 1200 may perform operation S544.

In operation S544, the storage controller 1200 may transmit a random data output command to the NVM device 1300. The storage controller 1200 may read the data stored in the latch 1331 by transmitting the random data output command instead of the read command.

In operation S545, the storage controller 1200 may receive the read data from the NVM device 1300. The NVM device 1300 may output the read data stored in the latch 1331 in response to the random data output command. The storage controller 1200 may receive, from the NVM device 1300, data stored in the latch 1331 before the reference time (tR).

In operation S551, the storage controller 1200 (e.g., the NVM interface circuit MI) may transmit the read command to the NVM device 1300. In operation S552, the storage controller 1200 (e.g., the NVM interface circuit MI) may receive the read data from the NVM device 1300. The NVM device 1300 may read the read data from the memory cell array in response to the read command. The NVM device 1300 may output the read data to the storage controller 1200. The NVM device 1300 may transmit the read data to the storage controller 1200 after the reference time (tR) from the time point when the read command is received.

As described above, the storage controller 1200 may configure a cache and load the read data from the cache. When the storage controller 1200 determines that the cache hit has occurred, the storage controller 1200 may load the read data from the cache and transmit the read data to the host device 10. The storage controller 1200 may load the read data from the cache instead of reading the read data from the memory cell array of the NVM device 1300. The storage controller 1200 may load the read data within less time than the reference time (tR). Accordingly, the storage device 1100 with reduced read latency and improved performance is provided.

Figure 10:
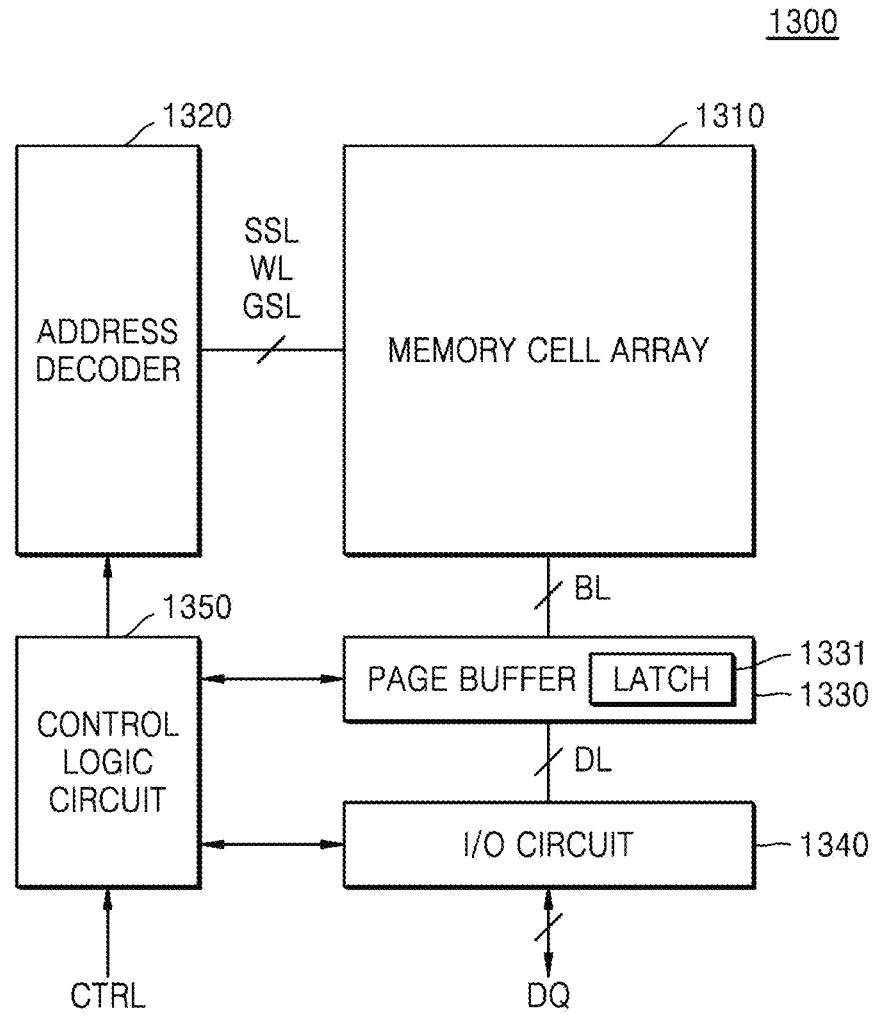
FIG. 10 is a block diagram illustrating an example of a non-volatile memory device according to an embodiment.

FIG. 10 is a block diagram illustrating an example of the NVM device 1300 according to an embodiment.

Referring to FIGS. 1 and 10, the NVM device 1300 may include a memory cell array 1310, an address decoder 1320, a page buffer circuit 1330, an I/O circuit 1340, and a control logic circuit 1350.

The memory cell array 1310 may include a plurality of memory blocks. Each of the memory blocks may include a plurality of cell strings. Each of the cell strings may include a plurality of cell transistors connected in series between a bit line and a common source line. The cell transistors may be connected to string select lines SSL, word lines WL, and ground select lines GSL. Each of the cell transistors (e.g., memory cells) may be configured to store at least 1-bit data according to a program operation of the NVM device 1300.

The address decoder 1320 may be connected to the memory cell array 1310 through the string select lines SSL, the word lines WL, and the ground select lines GSL. The address decoder 1320 may decode addresses received from the storage controller 1200 and control voltages of the string select lines SSL, the word lines WL, and the ground select lines GSL based on the decoded addresses.

The page buffer circuit 1330 may be connected to the memory cell array 1310 through a plurality of bit lines BL. The page buffer circuit 1330 may be configured to temporarily store data read from the memory cell array 1310 or data provided from the I/O circuit 1340. Although not illustrated, the page buffer circuit 1330 may include a plurality of page buffers respectively corresponding to the bit lines BL. Each of the page buffers may include a latch 1331 (e.g., data latches or cache latches) configured to temporarily store data.

The I/O circuit 1340 may be connected to the page buffer circuit 1330 through a plurality of data lines DL. The data lines DL may be respectively connected to or correspond to the page buffers described above. The I/O circuit 1340 may exchange data with the storage controller 1200 through a plurality of DQ lines DQ.

The control logic circuit 1350 may control overall operations of the NVM device 1300. For example, the control logic circuit 1350 may be configured to control the address decoder 1320, the page buffer circuit 1330, and the I/O circuit 1340 in response to a control signal CTRL from the storage controller 1200.

The NVM device 1300 may read data corresponding to the received addresses from the memory cell array 1310 in response to the read command. For example, the NVM device 1300 may read the data corresponding to the received addresses from the memory cell array 1310 and prepare the read data in the I/O circuit 1340. The data preparation operation described above may be performed during a reference time (e.g., tR). For example, for the reference time (tR), the NVM device 1300 may provide a ready/busy signal (R/B) of a logic low (i.e., a busy state) to the storage controller 1200.

In other words, the storage controller 1200 may transmit the read command to the NVM device 1300 and receive the read data from the NVM device 1300 after the reference time (tR) has elapsed. On the other hand, the storage controller 1200 may transmit a random data output (or random data read) command to the NVM device 1300 and receive the read data from the NVM device 1300 before the reference time (tR) has elapsed.

In the case of a cache hit, because the read data has already been stored in the latch 1331, the NVM device 1300 may not read data from the memory cell array 1310. The NVM device 1300 may transmit the read data stored in the latch 1331 to the storage controller 1200 without performing the data preparation operation. In case of a cache hit, read latency may be reduced by using the random data output command instead of the read command.

Figure 11:
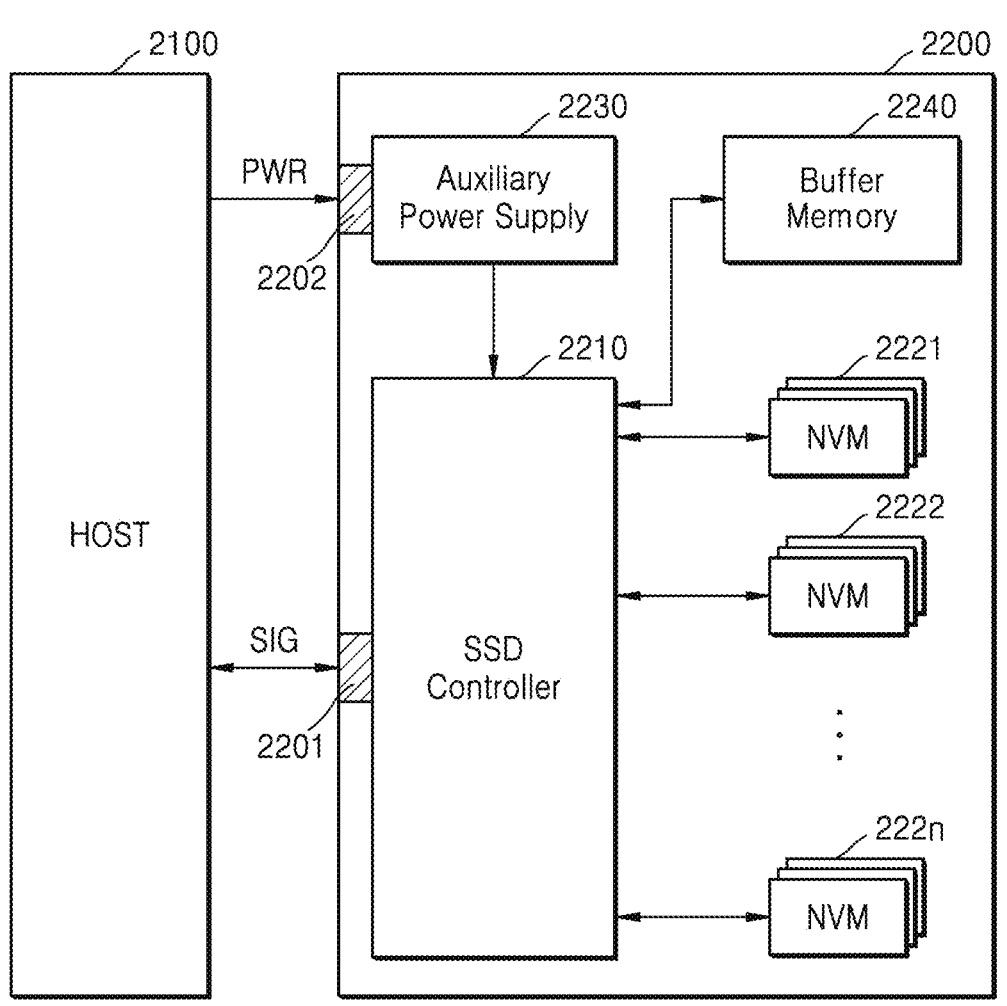
FIG. 11 is a block diagram illustrating a solid state drive (SSD) system to which a storage device is applied, according to an embodiment.

FIG. 11 is a block diagram illustrating a solid state drive (SSD) system 2000 to which a storage device is applied, according to an embodiment.

Referring to FIG. 11, the SSD system 2000 may include a host 2100 and an SSD 2200. The SSD 2200 may exchange a signal SIG with the host 2100 through a signal connector 2201 and receive power PWR through a power connector 2202. The SSD 2200 may include an SSD controller 2210, a plurality of flash memories 2221 to 222n, an auxiliary power supply 2230, and a buffer memory 2240.

The SSD controller 2210 may control the flash memories 2221 to 222n in response to the signal SIG received from the host 2100. The flash memories 2221 to 222n may operate under the control of the SSD controller 2210. The auxiliary power supply 2230 may be connected to the host 2100 through the power connector 2202. The auxiliary power supply 2230 may receive the power PWR from the host 2100 and may be charged with the power PWR. The auxiliary power supply 2230 may provide power to the SSD 2200 when the supply of power from the host 2100 is not smooth. The buffer memory 2240 may operate as a buffer memory of the SSD 2200.

For example, the SSD controller 2210 may include the address manager, the first DMA engine, and the cache manager, as described with reference to FIGS. 1 to 10. The SSD controller 2210 may perform first to third DMA operations based on the read data received from the flash memories 2221 to 222n. The SSD controller 2210 may implement a cache with the sub-buffer and the latches of the flash memories 2221 to 222*n*. In case of a cache hit, the SSD controller 2210 may load data from the cache and provide the data to the host 2100.

Figure 12:
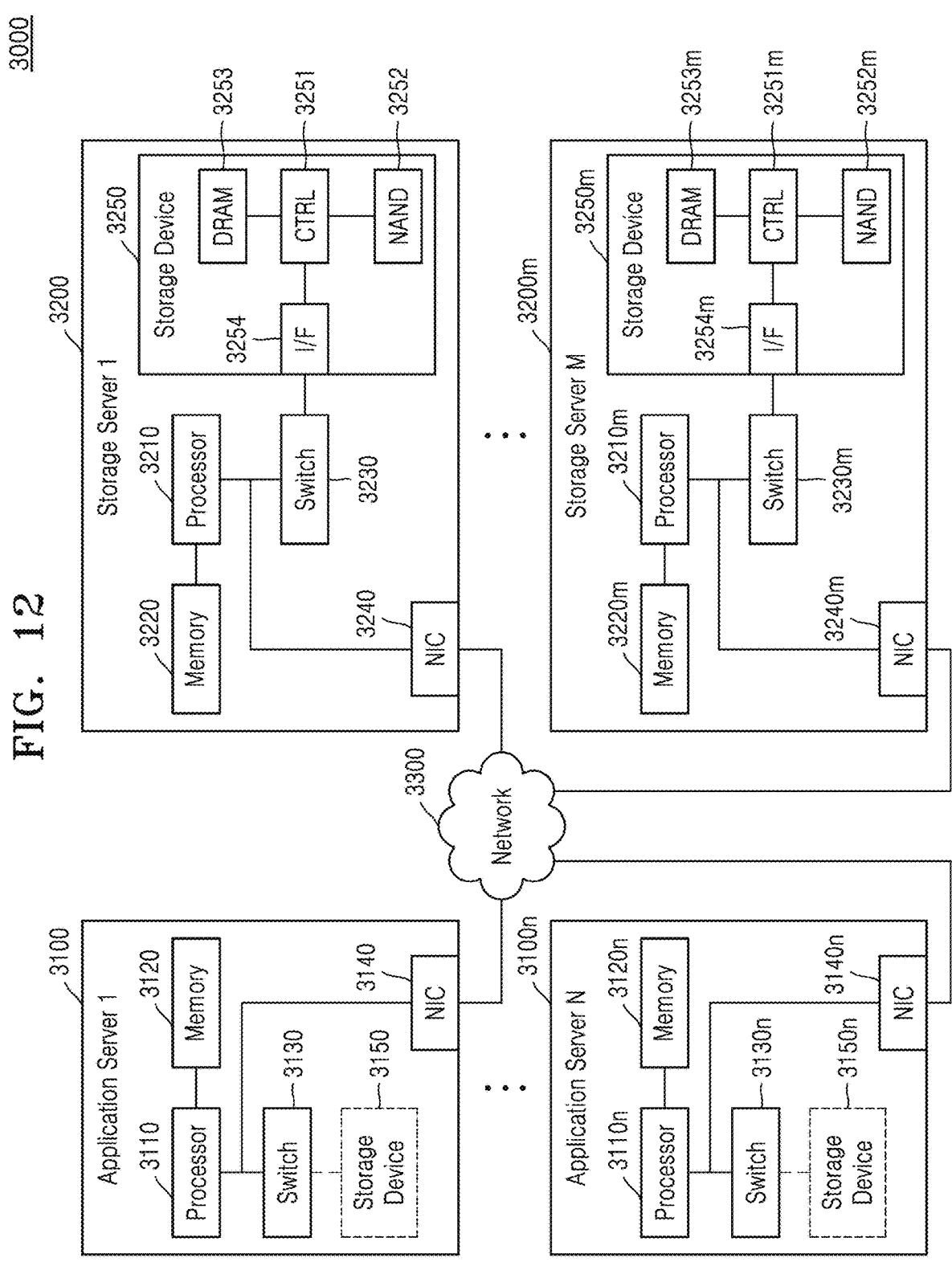
FIG. 12 is a diagram illustrating a data center to which a storage device is applied, according to an embodiment.

FIG. 12 is a diagram illustrating a data center 3000 to which a storage device is applied, according to an embodiment.

Referring to FIG. 12, the data center 3000 is a facility that collects various types of data and provides services, and may also be referred to as a data storage center. The data center 3000 may be a system for operating a search engine and a database, or may be a computing system used in companies, such as banks, or government agencies. The data center 3000 may include application servers 3100 to 3100*n* and storage servers 3200 to 3200*m*. The number of application servers 3100 to 3100*n* and the number of storage servers 3200 to 3200*m* may be variously selected according to embodiments, and the number of application servers 3100 to 3100*n* and the number of storage servers 3200 to 3200*m* may be different from each other.

The application server 3100 or the storage server 3200 may include at least one of processors 3110 and 3210 and memories 3120 and 3220. For example, in the case of the storage server 3200, the processor 3210 may control overall operations of the storage server 3200 and may access the memory 3220 to execute instructions and/or data loaded into the memory 3220. The memory 3220 may include double data rate synchronous DRAM (DDR SDRAM), high bandwidth memory (HBM), hybrid memory cube (HMC), dual in-line memory module (DIMM), Optane DIMM, and/or non-volatile DIMM (NVMDIMM). In some embodiments, the number of processors 3210 and memories 3220 included in the storage server 3200 may be variously selected. In an embodiment, the processor 3210 and the memory 3220 may provide a processor-memory pair. In an embodiment, the number of processors 3210 and the number of memories 3220 may be different from each other. The processor 3210 may include a single core processor or a multi-core processor. The above description of the storage server 3200 may be similarly applied to the application server 3100. In some embodiments, the application server 3100 may not include the storage device 3150. The storage server 3200 may include at least one storage device 3250. The number of storage devices 3250 included in the storage server 3200 may be variously selected according to embodiments.

The application servers 3100 to 3100*n* and the storage servers 3200 to 3200*m* may communicate with each other via a network 3300. The network 3300 may be implemented by using fiber channel (FC) or Ethernet. In this case, the FC is a medium used for relatively high-speed data transmission, and an optical switch that provides high performance and high availability may be used. The storage servers 3200 to 3200*m* may be provided as a file storage, a block storage, or an object storage according to an access method of the network 3300.

In an embodiment, the network 3300 may be a storage-only network, such as a storage area network (SAN). For example, the SAN may be a fiber channel (FC)-SAN that uses an FC network and is implemented according to an FC protocol (FCP). As another example, the SAN may be an Internet protocol (IP)-SAN that uses a transmission control protocol (TCP)/IP network and is implemented according to a small computer small interface (SCSI) over TCP/IP or Internet SCSI (iSCSI) protocol. In another embodiment, the network 3300 may be a general network, such as a TCP/IP network. For example, the network 3300 may be implemented according to a protocol, such as FC over Ethernet (FCoE), network attached storage (NAS), and NVMe over Fabrics (NVMe-oF).

The following description is given focusing on the application server 3100 and the storage server 3200. The description of the application server 3100 may also be applied to another application server 3100*n*, and the description of the storage server 3200 may also be applied to another storage server 3200*m*.

The application server 3100 may store data requested by a user or a client to be stored in one of the storage servers 3200 to 3200*m* via the network 3300. In addition, the application server 3100 may obtain data requested to be read by a user or a client from one of the storage servers 3200 to 3200*m* via the network 3300. For example, the application server 3100 may be implemented as a web server or a database management system (DBMS).

The application server 3100 may access the memory 3120*n* or the storage device 3150*n* included in another application server 3100*n* via the network 3300, or may access the memories 3220 to 3220*m* or the storage devices 3250 to 3250*m* included in the storage servers 3200 to 3200*m* via the network 3300. Accordingly, the application server 3100 may perform various operations on data stored in the application servers 3100 to 3100*n* and/or the storage servers 3200 to 3200*m*. For example, the application server 3100 may execute a command for moving or copying data between the application servers 3100 to 3100*n* and/or the storage servers 3200 to 3200*m*. In this case, the data may be moved from the storage devices 3250 to 3250*m* of the storage servers 3200 to 3200*m* through the memories 3220 to 3220*m* of the storage servers 3200 to 3200*m* to the application servers 3100 to 3100*n*, or may be directly moved from the storage devices 3250 to 3250*m* of the storage servers 3200 to 3200*m* to the application servers 3100 to 3100*n*. Data that are moved via the network 3300 may be encrypted data for security or privacy.

The storage server 3200 is described as an example. An interface 3254 may provide a physical connection between the processor 3210 and the controller 3251 and a physical connection between a network interconnect (NIC) 3240 and the controller 3251. For example, the interface 3254 may be implemented in a direct attached storage (DAS) method of directly connecting the storage device 3250 with a dedicated cable. In addition, for example, the interface 3254 may be implemented in various interface methods, such as advanced technology attachment (ATA), serial ATA (SATA), external SATA (e-SATA), SCSI, serial attached SCSI (SAS), peripheral component interconnection (PCI), PCI express (PCIe), NVM express (NVMe), IEEE 1394, universal serial bus (USB), secure digital (SD) card, multi-media card (MMC), embedded multi-media card (eMMC), universal flash storage (UFS), embedded universal flash storage (eUFS), and/or compact flash (CF) card interface.

The storage server 3200 may further include a switch 3230 and the NIC 3240. The switch 3230 may selectively connect the processor 3210 to the storage device 3250 or selectively connect the NIC 3240 to the storage device 3250 under the control of the processor 3210.

In an embodiment, the NIC 3240 may include a network interface card, a network adapter, etc. The NIC 3240 may be connected to the network 3300 by a wired interface, a wireless interface, a Bluetooth interface, an optical interface, etc. The NIC 3240 may include an internal memory, a digital signal processor (DSP), a host bus interface, etc., and may be connected to the processor 3210 and/or the switch 3230 through the host bus interface. The host bus interface may be implemented as one of the examples of interface 3254 described above. In an embodiment, the NIC 3240 may be integrated with at least one of the processor 3210, the switch 3230, and the storage device 3250.

In the storage servers 3200 to 3200m or the application servers 3100 to 3100n, the processor may program or read data by transmitting a command to the storage devices 3150 to 3150n and 3250 to 3250m or the memories 3120 to 3120n and 3220 to 3220m. In this case, the data may be data, an error of which is corrected through an ECC engine. The data is data that has been processed through data bus inversion (DBI) or data masking (DM), and may include cyclic redundancy code (CRC) information. The data may be encrypted for security or privacy.

The storage devices 3150 to 3150n and 3250 to 3250m may transmit control signals and command/address signals to NAND flash memory devices 3252 to 3252m in response to read commands received from the processors 3110 to 3110n and 3210 to 3210m. Accordingly, when data are read from the NAND flash memory devices 3252 to 3252m, a read enable (RE) signal may be input as a data output control signal and serve to output data to a DQ bus. Data strobe (DQS) may be generated by using the RE signal. The command and the address signal may be latched in a page buffer according to a rising edge or a falling edge of a write enable (WE) signal.

The controller 3251 may control overall operations of the storage device 3250. In an embodiment, the controller 3251 may include SRAM. The controller 3251 may write data to the NAND flash memory device 3252 in response to a write command, or may read data from the NAND flash memory device 3252 in response to a read command. For example, the write command and/or the read command may be provided from the processor 3210 of the storage server 3200, the processor 3210m of the storage server 3200m, or the processors 3110 and 3110n of the application servers 3100 and 3100n. The DRAM 3253 may temporarily store (buffer) data to be written to the NAND flash memory device 3252 or data read from the NAND flash memory device 3252. In addition, the DRAM 3253 may store metadata. The metadata is data generated by the controller 3251 so as to manage user data or the NAND flash memory device 3252. The storage device 3250 may include a secure element (SE) for security or privacy.

In an embodiment, the storage devices 3150 to 3150n and 3250 to 3250m may include the address manager, the first DMA engine, and the cache manager described with reference to FIGS. 1 to 11. The storage devices 3150 to 3150n and 3250 to 3250m may perform the first to third DMA operations, as described with reference to FIGS. 1 to 11.

In an embodiment, the storage devices 3150 to 3150n and 3250 to 3250m may directly transmit the read data read from the NVM device to the outside (i.e., a device that is outside of the application servers 3100 to 3100n and the storage servers 3200 to 3200m) without writing data to the buffer memory. The storage devices 3150 to 3150n and 3250 to 3250m may use the virtual address to transmit the read data to the address manager without writing data to the buffer memory. The storage devices 3150 to 3150n and 3250 to 3250m may perform an address translation operation to convert a virtual address to a host address.

Although the embodiments have been described based on the read operation of the storage device, the scope of the inventive concept is not limited thereto. For example, during a write operation of the storage device, write data may be directly transmitted to the NVM device without being stored in the buffer memory. The storage controller may use the virtual address to directly transmit the write data to the NVM device without writing data to the buffer memory.

While the inventive concept has been particularly shown and described with reference to embodiments thereof, it will be understood that various changes in form and details may be made therein without departing from the scope of the following claims.

What is claimed is:

1. An operating method of a storage controller that includes a buffer memory, an address manager, and a direct memory access (DMA) engine and controls a non-volatile memory device, the operating method comprising:
   receiving, from an external host device, a read request including a host address;
   storing, by the address manager in response to the read request, mapping information about the host address and a command identifier corresponding to the read request in a translation table;
   setting, by the DMA engine, a destination address of read data corresponding to the read request to a virtual address corresponding to the command identifier and transmitting the read data to the virtual address; and
   translating, by the address manager based on the translation table, the destination address of the read data from the virtual address to the host address,
   wherein the virtual address is different from a physical address of the buffer memory.

2. The operating method of claim 1, further comprising transmitting the read data to the host address of the external host device.

3. The operating method of claim 1, further comprising transmitting, by the address manager, mode information indicating a first mode to the DMA engine,
   wherein the first mode is a mode in which the read data is transmitted to the virtual address without writing the read data to the buffer memory.

4. The operating method of claim 3, wherein the setting, by the DMA engine, of the destination address of the read data corresponding to the read request to the virtual address corresponding to the command identifier and the transmitting of the read data to the virtual address comprise:
   determining the virtual address by referring to a look-up table that maps the command identifier to the virtual address;
   determining whether the mode information indicates the first mode, a second mode, or a third mode;
   in response to determining that the mode information indicates the first mode, setting the destination address of the read data to the virtual address corresponding to the command identifier and transmitting the read data to the virtual address; and
   in response to determining that the mode information indicates the second mode, setting the destination address of the read data to an address of the buffer memory and transmitting the read data to the address of the buffer memory,
   wherein the second mode is a mode in which the read data is written to the buffer memory.

5. The operating method of claim 1, further comprising transmitting, by the address manager, mode information indicating a third mode to the DMA engine,
   wherein the third mode is a mode in which the read data is transmitted to the virtual address and the read data is written to the buffer memory.

6. The operating method of claim 5, wherein the setting, by the DMA engine, of the destination address of the read data corresponding to the read request to the virtual address corresponding to the command identifier and the transmitting of the read data to the virtual address comprise:

determining whether the mode information indicates the third mode; and in response to determining that the mode information indicates the third mode, transmitting the read data to the virtual address and transmitting the read data to an address of the buffer memory.

7. The operating method of claim 1, further comprising:

transmitting a read command to the non-volatile memory device; and receiving the read data from the non-volatile memory device in response to transmitting the read command.

8. The operating method of claim 1, further comprising:

determining whether a cache hit has occurred;

in response to determining that the cache hit has occurred, loading the read data from a cache memory; and in response to determining that a cache miss has occurred, reading the read data from a memory cell array of the non-volatile memory device.

9. The operating method of claim 8, wherein the loading of the read data from the cache memory in response to determining that the cache hit has occurred comprises:

determining whether the read data is cached in a sub-buffer; and in response to determining that the read data is cached in the sub-buffer, loading the read data from the sub-buffer, wherein the sub-buffer is a memory that is used by an error correction code (ECC) engine.

10. The operating method of claim 9, wherein the loading of the read data from the cache memory in response to determining that the cache hit has occurred further comprises:

determining whether the read data is cached in a latch of the non-volatile memory device; and in response to determining that the read data is cached in the latch of the non-volatile memory device, loading the read data from the latch of the non-volatile memory device.

11. The operating method of claim 10, wherein the loading of the read data from the latch of the non-volatile memory device comprises:

transmitting a random data output command to the non-volatile memory device; and receiving the read data from the non-volatile memory device.

12. An operating method of a storage device including a non-volatile memory device and a storage controller that includes a host interface circuit, an address manager, a direct memory access (DMA) engine, and a non-volatile memory interface circuit and controls the non-volatile memory device, the operating method comprising:

receiving, by the host interface circuit, a read request including a host address from an external host device;

storing, by the address manager, mapping information about the host address and a command identifier corresponding to the read request received from the host interface circuit in a translation table;

generating, by the address manager, mode information and transmitting the mode information to the DMA engine;

setting, by the DMA engine, a destination address of read data to a virtual address based on the mode information and transmitting the read data to the virtual address;

translating, by the address manager, the destination address of the read data from the virtual address to the host address; and transmitting, by the host interface circuit, the read data to the host address.

13. The operating method of claim 12, further comprising:

transmitting, by the non-volatile memory interface circuit, a read command to the non-volatile memory device; and outputting, by the non-volatile memory device, the read data to the non-volatile memory interface circuit in response to the read command.

14. The operating method of claim 12, further comprising:

when the mode information indicates a first mode, transmitting, by the DMA engine, the read data to the virtual address;

when the mode information indicates a second mode, writing, by the DMA engine, the read data to a buffer memory of the storage controller; and when the mode information indicates a third mode, transmitting, by the DMA engine, the read data to the virtual address and writing the read data to the buffer memory.

15. The operating method of claim 14, wherein the DMA engine is a first DMA engine, and wherein the operating method further comprises:

when the mode information indicates the second mode, loading, by a second DMA engine included in the storage controller, the read data from the buffer memory; and transmitting, by the second DMA engine, the read data loaded from the buffer memory to the host address.

16. The operating method of claim 12, further comprising:

determining, by a cache manager included in the storage controller, whether a cache hit has occurred;

in response to determining that the cache hit has occurred, loading, by the cache manager, the read data from a cache; and in response to determining that a cache miss has occurred, reading, by the non-volatile memory interface circuit, read data from a memory cell array of the non-volatile memory device.

17. A storage controller comprising:

a host interface circuit configured to receive a read request from an external host device and transmit, to the external host device, read data corresponding to the read request;

an address manager configured to receive a command identifier and a host address from the host interface circuit, store mapping information about the command identifier and the host address in a translation table, and perform an address translation operation to translate a destination address of the read data from a virtual address to the host address; and a direct memory access (DMA) engine configured to set the destination address of the read data to the virtual address based on mode information received from the address manager and transmit the read data to the virtual address.

18. The storage controller of claim 17, wherein the DMA engine is further configured to transmit the read data to the virtual address when the mode information indicates a first mode, write the read data to a buffer memory when the mode information indicates a second mode, and transmit the read data to the virtual address and write the read data to the buffer memory when the mode information indicates a third mode.

19. The storage controller of claim 18,
wherein the DMA engine is a first DMA engine, and
wherein the storage controller further comprises a second
DMA engine configured to read the read data stored in
the buffer memory and transmit the read data to the host
address.

20. The storage controller of claim 17, further comprising
a cache manager configured to determine whether a cache
hit has occurred, and load the read data from a cache in
response to determining that the cache hit has occurred,
wherein the cache comprises a latch of a non-volatile
memory device and a memory of an error correction
code (ECC) engine.

\* \* \* \* \*